United States Patent
Agarwal et al.

(10) Patent No.: US 11,321,160 B2
(45) Date of Patent: May 3, 2022

(54) IN A MICROSERVICES-BASED APPLICATION, MAPPING DISTRIBUTED ERROR STACKS ACROSS MULTIPLE DIMENSIONS

(71) Applicant: SPLUNK INC., San Francisco, CA (US)

(72) Inventors: Mayank Agarwal, Kirkland, WA (US); Steven Flanders, Nashua, NH (US); Justin Smith, San Francisco, CA (US); Gergely Danyi, Redwood City, CA (US)

(73) Assignee: SPLUNK INC., San Francisco, CA (US)

( * ) Notice: Subject to any disclaimer, the term of this patent is extended or adjusted under 35 U.S.C. 154(b) by 369 days.

(21) Appl. No.: 16/672,210

(22) Filed: Nov. 1, 2019

(65) Prior Publication Data
US 2021/0133015 A1 May 6, 2021

(51) Int. Cl.
| | | |
|---|---|---|
| G06F 11/00 | (2006.01) | |
| G06F 11/07 | (2006.01) | |
| G06F 16/2455 | (2019.01) | |
| G06F 16/25 | (2019.01) | |
| G06F 11/34 | (2006.01) | |
| G06F 11/36 | (2006.01) | |

(52) U.S. Cl.
CPC ........ *G06F 11/079* (2013.01); *G06F 11/0751* (2013.01); *G06F 11/0793* (2013.01); *G06F 11/3466* (2013.01); *G06F 11/36* (2013.01); *G06F 16/2455* (2019.01); *G06F 16/252* (2019.01)

(58) Field of Classification Search
CPC ............... G06F 11/079; G06F 11/0751; G06F 11/0793; G06F 11/3466; G06F 11/36
See application file for complete search history.

(56) References Cited

U.S. PATENT DOCUMENTS

| | | | |
|---|---|---|---|
| 10,540,259 B1 * | 1/2020 | Kramer | G06F 11/3409 |
| 10,642,719 B1 * | 5/2020 | Balasubramanian | G06N 5/022 |
| 10,657,019 B1 * | 5/2020 | Chopra | G06F 11/3006 |
| 10,986,012 B1 * | 4/2021 | Cote | H04L 67/10 |
| 2018/0113790 A1 * | 4/2018 | Chunduri | H04L 67/16 |
| 2018/0270122 A1 * | 9/2018 | Brown | H04L 41/5045 |
| 2019/0087179 A1 * | 3/2019 | Velayudham | G06F 8/71 |
| 2019/0095509 A1 * | 3/2019 | Brown | G06F 16/284 |
| 2019/0155722 A1 * | 5/2019 | Gupta | G06F 11/3409 |

(Continued)

*Primary Examiner* — Jonathan D Gibson

(57) ABSTRACT

A method of tracking errors in a system comprising microservices comprises ingesting a plurality of spans generated by the microservices during a given duration of time. The method further comprises consolidating the plurality of spans associated with the given duration of time into a plurality of traces, wherein each trace comprises a subset of the plurality of spans that comprise a common trace identifier. For each trace, the method comprises: a) mapping a respective trace to one or more error stacks computed for the respective trace and to one or more attributes determined for the respective trace; and b) emitting each error stack computed from the respective trace with an associated pair of attributes. The method then comprises reducing duplicate pairs of error stack and associated attributes and maintaining a count for each pair of error stack and associated attributes.

30 Claims, 28 Drawing Sheets

(56) References Cited

U.S. PATENT DOCUMENTS

| | | | |
|---|---|---|---|
| 2019/0303266 A1* | 10/2019 | Bonnell | G06F 16/9024 |
| 2020/0019622 A1* | 1/2020 | Lu | G06F 16/1748 |
| 2020/0092180 A1* | 3/2020 | Bajaj | H04L 41/22 |
| 2020/0272441 A1* | 8/2020 | Rapson | G06F 8/433 |
| 2020/0328952 A1* | 10/2020 | Makwarth | H04L 67/02 |
| 2020/0366573 A1* | 11/2020 | White | H04L 43/50 |
| 2021/0026646 A1* | 1/2021 | Jha | G06F 9/541 |
| 2021/0075887 A1* | 3/2021 | Pavlin | G06F 11/0793 |

\* cited by examiner

{productcatalogservice, 503, TRUE, TRUE}
FIG. 13A
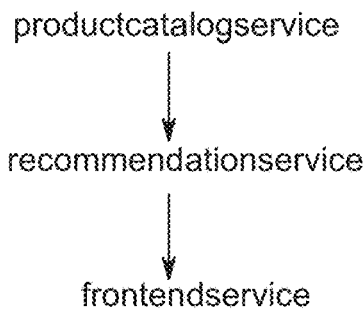
FIG. 13B
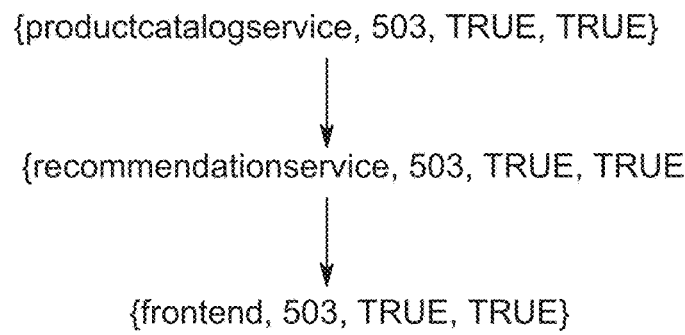
FIG. 13C
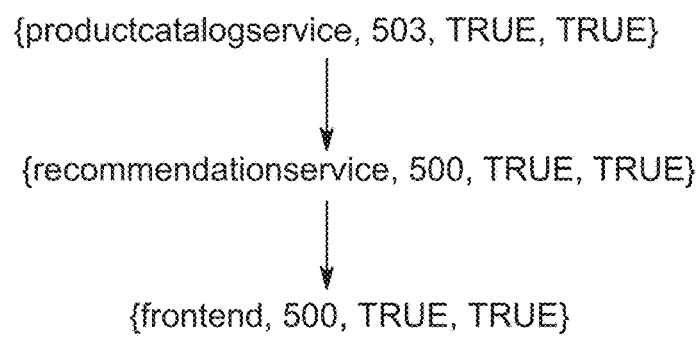
FIG. 13D

| Trace ID | Duration | Start Time | Root Operation | Root Cause Error | Spans | | |
|---|---|---|---|---|---|---|---|
| 6e213e5e98e295df2 | 233ms | 3 minutes ago | /cart | | frontend(4) | recommendationservice(2) | cartservice(1) | productcatalogservice(1) |
| a19d860e2f6687e8 | 332ms | 3 minutes ago | /cart | | frontend(4) | cartservice(1) | recommendationservice(2) | productcatalogservice(1) |
| 4b95a6015e79040c | 336ms | 3 minutes ago | /cart | | frontend(4) | cartservice(1) | recommendationservice(2) | productcatalogservice(1) |
| a311c3310433b1f | 381ms | 3 minutes ago | /cart | | frontend(4) | recommendationservice(2) | cartservice(1) | productcatalogservice(1) |
| d76d7216eaa9a432 | 260ms | 3 minutes ago | /cart | | frontend(4) | cartservice(1) | recommendationservice(2) | productcatalogservice(1) |
| 3940964bcb05546 | 231ms | 3 minutes ago | /cart | | frontend(4) | cartservice(1) | recommendationservice(2) | productcatalogservice(1) |
| f5615dd576bba26c | 265ms | 3 minutes ago | /cart | | frontend(4) | cartservice(1) | recommendationservice(2) | productcatalogservice(1) |
| 1d99803bf5615bca | 386ms | 3 minutes ago | /cart | | frontend(4) | cartservice(1) | recommendationservice(2) | productcatalogservice(1) |
| 1855d4497a5c59f3 | 233ms | 3 minutes ago | /cart | | frontend(4) | recommendationservice(2) | cartservice(1) | productcatalogservice(1) |
| 77951bf8d7e1d455 | 215ms | 3 minutes ago | /cart | | frontend(4) | recommendationservice(2) | cartservice(1) | productcatalogservice(1) |

FIG. 23

IN A MICROSERVICES-BASED APPLICATION, MAPPING DISTRIBUTED ERROR STACKS ACROSS MULTIPLE DIMENSIONS

BACKGROUND

Computer systems may run applications or services that are provided via a server or cloud. A client computer system may send a request to a server that retrieves application installation files in an underlying database. The applications or services can be developed and deployed as a single unit or as multiple units, such as a collection of microservices. Applications that are developed as single unit may be a monolithic application that includes a user interface and data access codes combined into a single program from a single platform. Monolithic applications are self-contained and independent from other computing applications. With the advent of cloud computing, however, these large centralized monolithic systems are being decoupled and distributed to address scalability needs and to allow companies to deliver value faster.

Microservices or microservice architecture is a software development method of developing software applications as a suite of independently deployable smaller cooperating services. The cooperating services run processes and communicate to serve a business goal to form an enterprise application. More specifically, in a microservice architecture, an application is developed as a collection of small services; each service implements business capabilities, runs in its own process and communicates via APIs (e.g., HTTP APIs) or messaging. Each microservice can be deployed, upgraded, scaled, and restarted independent of other services in the application, typically as part of an automated system, enabling frequent updates to live applications without impacting end customers.

With the rise of cloud native applications, which include microservices, there has been not only a shift in the manner in which software is built and deployed, but also in the manner in which it is monitored and observed. Microservices based applications have to deal with dramatically increased complexity and many more layers of abstraction compared to previous generations of monolithic applications. Compared to monolithic applications, microservice architectures introduce complexity in network communication, feature short lifecycles, and require resiliency in dynamic environments.

As companies begin to increasingly rely on microservice architectures, they run into operational complexity and struggle to efficiently monitor their environments. One of the challenges associated with microservice architectures, for example, is getting visibility in distributed workflows without a central orchestrator. Traditional monitoring and troubleshooting tools, designed as symptom-based solutions with single purpose capabilities, result in information overload and are unable to keep up with the dynamic nature of cloud native applications. Thus, systems that can efficiently and accurately monitor microservice architectures and microservices based applications are the subject of considerable innovation.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The challenges associated with monitoring, troubleshooting and tracking errors in microservice architectures has led to the rise of distributed tracing, which deals with tracing user requests through applications that are distributed. One of the challenges in implementing microservice observability with distributed tracing systems is pinpointing where errors originated and filtering and/or aggregating any diagnostic data gathered by criteria that is relevant to a user. In a microservice architecture, an error associated with a particular request may originate in one of the services and might manifest as errors across all the services that participate in that request. Further, the errors may be associated with various attributes, e.g., type of client that generated the error, the environment of the client, etc.

Embodiments of the present invention allow clients of a monitoring platform to track the causal chain of operations that resulted in an error or possibly a degraded response being returned to a client in response to a request. In order to track the causal chain of operations, the monitoring platform may utilize distributed error stacks. A distributed error stack (also referred to as a "trace error signature") is a type of signature that summarizes a causal chain of operations encountered during trace execution that resulted in an error, and, further, also summarizes information pertaining to the root cause of the error. Embodiments of the present invention are further able to extract various attributes associated with each of the traces, and associate the attributes with the computed trace error signatures through a mapping and reduction process.

In one or more embodiments, following trace ingestion, for each window of time, a mapping process emits several pairs, each comprising a "trace error signature" and associated "attributes." Thereafter, in a reduction process, all duplicate "trace error signature" and associated "attributes" pairs are reduced and a count is maintained for how often each pair occurred for a given time window. Aggregating trace error signatures by all the associated attributes allows users the ability to filter the error information accumulated by any dimension.

The pairing and reduction process enables embodiments of the present invention to support breaking down the trace error signatures by different dimensions. For example, a user may be able to break down error stacks by type of client. The pairing and reduction process also enables embodiments of the present invention to compute full-fidelity service level indicators (SLIs) across many different dimensions and allow user to filter and aggregate SLIs across any dimension.

According to one or more embodiments of the present disclosure, a method is provided for tracking errors in a system comprising microservices. The method comprises ingesting a plurality of spans generated by the microservices during a given duration of time. The method further comprises consolidating the plurality of spans associated with the given duration of time into a plurality of traces, wherein each trace comprises a subset of the plurality of spans that comprise a common trace identifier. For each trace, the method comprises: a) mapping a respective trace to one or more error stacks computed for the respective trace and to one or more attributes determined for the respective trace; and b) emitting each error stack computed from the respective trace with an associated pair of attributes. The method then comprises reducing duplicate pairs of error stack and associated attributes and maintaining a count for each pair of error stack and associated attributes.

According to a second embodiment of the present disclosure a non-transitory computer-readable medium having computer-readable program code embodied therein for causing a computer system to perform a method for tracking errors in a system comprising microservices is provided. The method comprises ingesting a plurality of spans generated by the microservices during a given duration of time. The method further comprises consolidating the plurality of spans associated with the given duration of time into a plurality of traces, wherein each trace comprises a subset of the plurality of spans that comprise a common trace identifier. For each trace, the method comprises: a) mapping a respective trace to one or more error stacks computed for the respective trace and to one or more attributes determined for the respective trace; and b) emitting each error stack computed from the respective trace with an associated pair of attributes. The method then comprises reducing duplicate pairs of error stack and associated attributes and maintaining a count for each pair of error stack and associated attributes.

According to a third embodiment of the present disclosure a system is provided for tracking errors in a network comprising microservices. The system comprises a processing device communicatively coupled with a memory and configured to: (a) ingest a plurality of spans generated by the microservices during a first duration of time; (b) consolidate the plurality of spans associated with the first duration of time into a plurality of traces, wherein each trace comprises a subset of the plurality of spans that comprise a common trace identifier; (c) for each trace of the plurality of traces, map a respective trace to one or more error stacks computed for the respective trace and to one or more attributes determined for the respective trace; and emit each error stack computed from the respective trace with an associated pair of attributes; and (d) reduce duplicate pairs of error stack and associated attributes and maintaining a count for each pair of error stack and associated attributes.

BRIEF DESCRIPTION OF THE DRAWINGS

In the drawings:

FIG. 13A illustrates an exemplary span error signature in accordance with embodiments of the present invention.

FIG. 13B illustrates an exemplary call path in accordance with embodiments of the present invention.

FIGS. 13C and 13D illustrates two exemplary trace error signatures that may be created from the chain shown in FIG. 13B in accordance with embodiments of the present invention.

FIG. 23 illustrates the manner in which spans generated by a microservices-based application may be filtered by their associated attributes through an exemplary on-screen GUI in accordance with embodiments of the present invention.

DETAILED DESCRIPTION

Figure 1A:
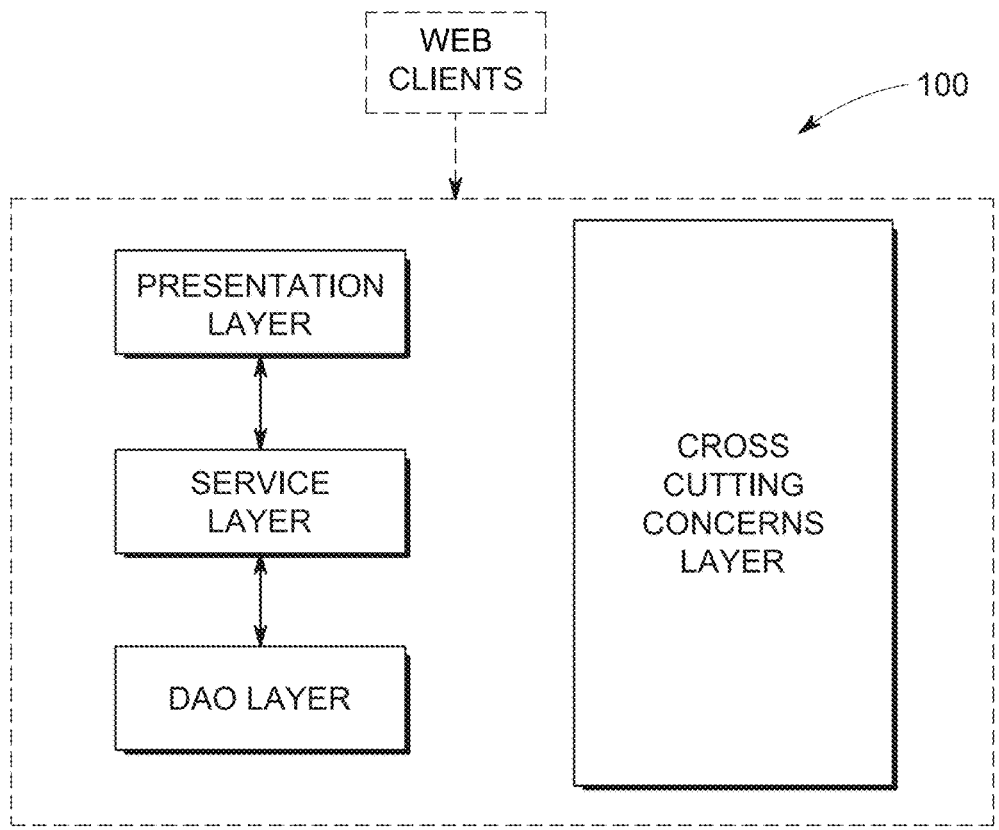
FIG. 1A illustrates an exemplary monolithic multi-layer architecture.

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "determining," "identifying," "creating," "grouping," "associating," "computing," "reducing," "storing," "extracting," "sampling," "inputting," "performing," "using," "applying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The description below provides a discussion of computers and other devices that may include one or more modules. As used herein, the term "module" or "block" may be understood to refer to software, firmware, hardware, and/or various combinations thereof. It is noted that the blocks and modules are exemplary. The blocks or modules may be combined, integrated, separated, and/or duplicated to support various applications. Also, a function described herein as being performed at a particular module or block may be performed at one or more other modules or blocks and/or by one or more other devices instead of or in addition to the function performed at the described particular module or block. Further, the modules or blocks may be implemented across multiple devices and/or other components local or remote to one another. Additionally, the modules or blocks may be moved from one device and added to another device, and/or may be included in both devices. Any software implementations of the present invention may be tangibly embodied in one or more storage media, such as, for example, a memory device, a floppy disk, a compact disk (CD), a digital versatile disk (DVD), or other devices that may store computer code.

Embodiments are described herein according to the following outline:

1.0 Definitions
2.0 General Overview
3.0 Data Collection
4.0 Using Distributed Error Stacks To Track Error Propagation
   4.1 Full-Context Service Graph 4.2 Full-Fidelity Service Level Indicators
4.3 Distributed Error Stacks
4.4 Mapping Error Stacks Across Multiple Attributes
5.0 Probe Exclusion
6.0 Logs, Traces and Metrics

1.0 Definitions

The term "trace" as used herein refers to a record of the manner in which a single user request, also referred to as a transaction, propagates from one microservice (hereinafter, interchangeably, referred to as "service") to the next in a distributed application. A transaction is generally described as an end-to-end request-response flow, from the making of the user's initial request to receiving the final response. A transaction often involves the interaction of multiple services. A trace is the record of a transaction and each trace is identified using a unique trace identifier ("Trace ID"). The trace follows the course of a request or transaction from its source to its ultimate destination in a distributed system. A trace may be conceptualized as a highly dimensional structured log that captures the full graph of user-generated and background request execution within an application, and contains valuable information about interactions as well as causality.

The term "span" as used herein refers to the primary building block of a trace, representing an individual unit of work done in a distributed system. A trace is composed of one or more spans where a span represents a call within the request. It is appreciated that a call may be to a separate microservice or a function within a microservice. The trace captures the work done by each microservice as a collection of linked spans all sharing the same unique Trace ID. Each component of the distributed system may contribute a span—a named, timed operation representing a piece of the workflow. A span may also include a unique span ID, a service name, operation, duration (latency), and additional annotations and attributes (e.g., tags). The annotations and attributes can describe and contextualize the work being done under a span.

The term "tags" as used herein refers to key:value pairs that enable user-defined annotation of spans in order to query, filter and comprehend trace data. Tag information is typically included with each span and there may be different levels of tag information included in a span.

"Global tags" represent properties of a user-request (e.g. tenant name, tenant level, client location, environment type, etc.) and can be extracted from any span of the trace based on configured rules. A global tag for a particular span in a trace may be attributed to the other spans in a trace, because all spans within a single trace would comprise the same global attributes. For example, if one span within a trace comprises a tag relating it to a request from a "gold" level "tenant," it may be inferred that all the other spans in the same trace are associated with the same request and, accordingly, from the same "gold" level "tenant." Accordingly, the "tenant:gold" key-value pair or tag may be attributed to all the other spans in the same trace.

"Service-level tags" represent a non-global property of the service or the infrastructure that the associated span (which served a portion of the request) executed on, e.g., service version, host name, region, etc. Spans that executed on different services may have different values for the same tag, e.g. tag "region" may take different values in two services: a span in Service A may be attributed to "region: east", and a span in Service B attributed to "region:west". Also, multiple instances of the same service can serve different parts of the request and so the same service may be associated with different service-level tags in relation to those different parts.

"Span-level tags" comprise attributes that are specific to a particular span.

The term "root span" as used herein refers to the first span in a trace. A span without a parent is called a root span.

The term "child span" as used herein refers to any span that follows a root span, including a child of a child.

The term "parent span" as used herein refers to any span that executes a call (to a different service or a function within the same service) that generates another span, wherein the span executing the call is the "parent span" and the span generated in response to the call is the "child span." Each span may typically comprise information identifying its parent span, which along with the Trace ID, may be used to consolidate spans associated with the same user-request into a trace.

2.0 General Overview

One of the fundamental shifts in modern day computing has been the shift from monolithic applications to microservices-based architectures. As previously mentioned, this is the shift from an application being hosted together (e.g. on a single system) to each piece of an application being hosted separately (e.g. distributed). FIG. 1A illustrates an exemplary monolithic multi-layer architecture. A monolithic application is traditionally built as a single unit. The monolithic application consists of a single self-contained unit in which all code exists in a single codebase 100, and in which modules are interconnected. At deployment time, the entire codebase is deployed, and scaling is achieved by adding additional nodes.

Figure 1B:
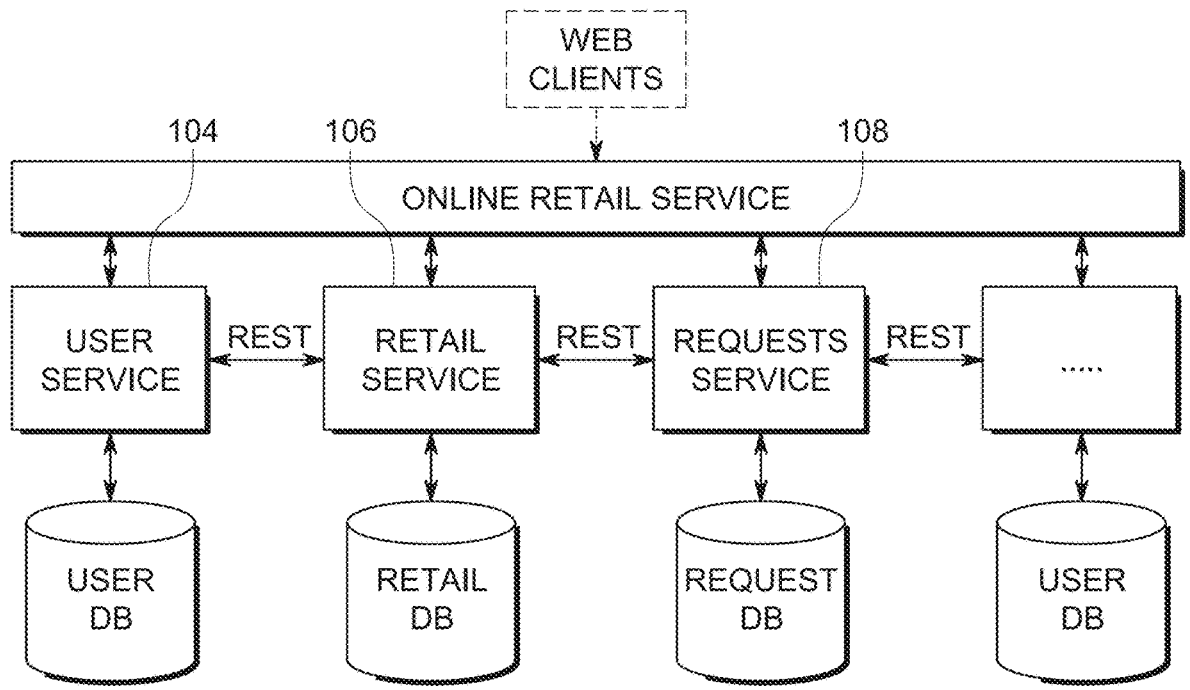
FIG. 1B illustrates an exemplary microservice architecture.

FIG. 1B illustrates an exemplary microservice architecture. A microservices architecture involves the building of modules (e.g., modules 104, 106 and 108) that address a specific task or business objective. As a result, these modules tend to exhibit low coupling and high cohesion. A microservice architecture is often achieved by decoupling a monolithic application into independent modules that each contain the components necessary to execute a single business function. These services typically communicate with each other using language agnostic APIs such as Representational State Transfer (REST).

Microservices were created in order to overcome the issues and constraints of monolithic applications. Monolithic applications have a tendency over time to grow in size. As applications become larger and larger, the tight coupling between components results in slower and more challenging deployments. Because of the tight coupling, the potential for a failure of the entire application due to a recently deployed feature is high. In some cases, deployments can take several months to a year, greatly reducing the number of features that can be rolled out to users. This tight coupling also makes it difficult to reuse and replace components because of the effect they may have on other components throughout the application.

Microservices address these issues by being small in scope and modular in design. Modular design results in components being loosely coupled, which offers enormous benefits from the standpoint of being fault tolerant and independently deployable. The result is functionality that can be frequently deployed and continuously delivered. The loosely coupled modules without a central orchestrator in a microservice architecture, however, leads to considerable challenges in terms of monitoring, troubleshooting, and tracking errors.

These challenges have led to the rise of observability, a new generation of monitoring, the foundation for which is built on distributed tracing. Distributed tracing, also called distributed request tracing, is a method used to profile and monitor applications, especially those built using a microservices architecture. Distributed tracing helps pinpoint where failures occur and what causes poor performance. Distributed tracing, as the name implies, deals with tracing user requests through applications that are distributed. A trace represents a single user request, also referred to as a transaction, and represents the entire lifecycle of a request as it moves across all of the services or components of a distributed system.

Figure 2A:
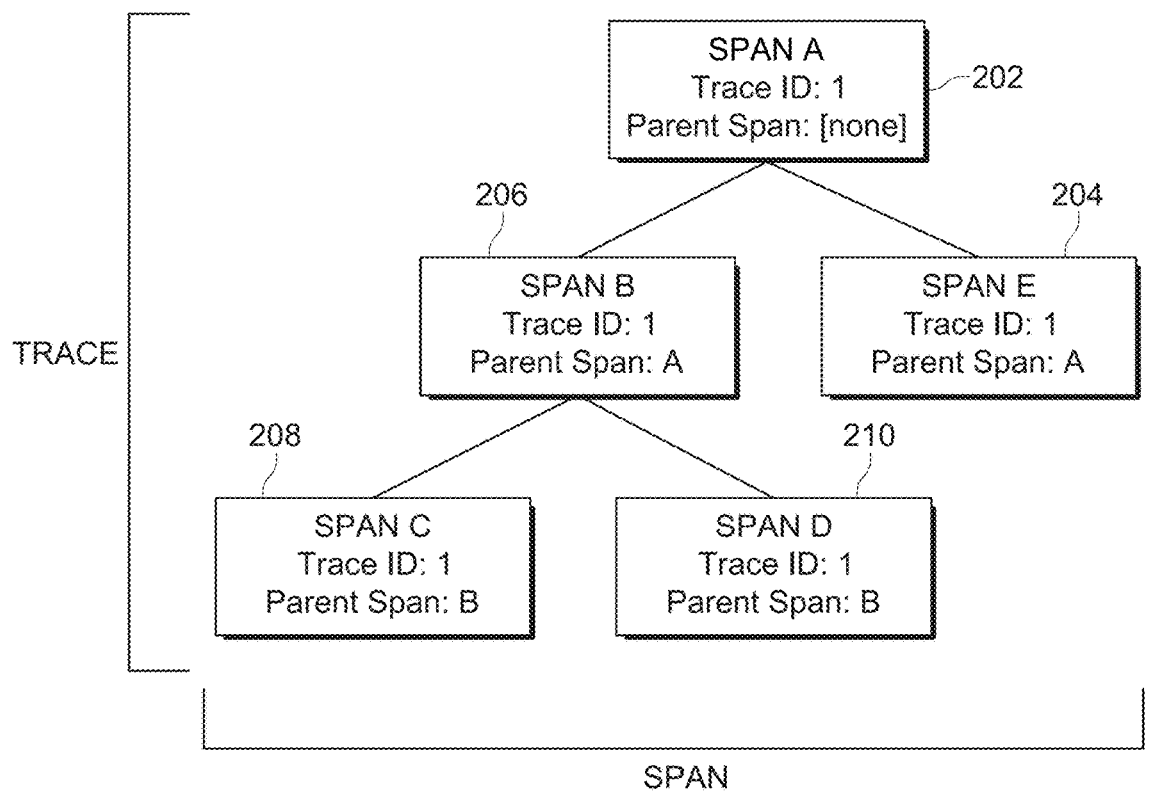
FIG. 2A illustrates an exemplary trace tree.

FIG. 2A illustrates an exemplary trace tree. The first span in the trace tree, Span A 202, is known as the root span. A trace tree always has one span that does not have a parent and, that is, the root span. It can be followed by one or more child spans. Child spans can also be nested as deep as the call stack goes. Span B 206 and Span E 204 are child spans of the parent span, Span A. Further, Span C 208 and Span D 210 are child spans of parent Span B.

Figure 2B:
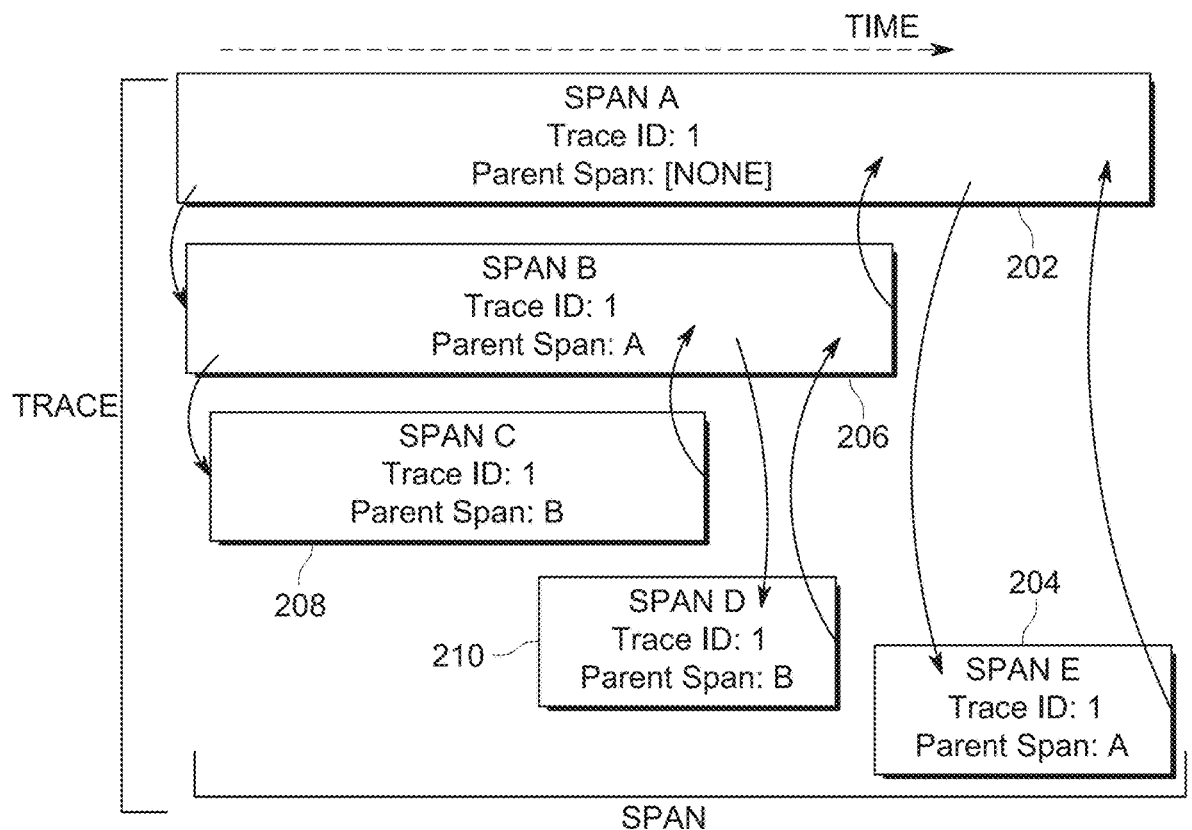
FIG. 2B illustrates an alternate view of the trace from FIG. 2A adjusted for timeline.

FIG. 2B illustrates an alternate view of the trace from FIG. 2A adjusted for timeline. The trace starts with Span A, the root spans, where the request starts. When the trace starts, a Trace ID is generated (e.g., Trace ID: 1 as shown in FIG. 2B), which follows the request as it propagates through the distributed system. A new span is generated for each logical chunk of work in the request, where the new span contains the same Trace ID, a new Span ID, and the Parent Span ID (which points to the span ID of the new span's logical parent). The Parent Span ID creates a parent-child relationship between spans.

A given request typically comprises one span (e.g. root Span A 202) for the overall request and a child span for each outbound call made to another service, database, or a function within the same microservice etc. as part of that request. For example, in the example of FIG. 2B, Span A 202 is the root span for the overall request and generates several child spans to service the request. Span A 202 makes a call to Span B 206, which in turn makes a call to Span C 208, which is a child span of Span B 206. Span B 206 also makes a call to Span D 210, which is also a child span of Span B 206. Span A 202 subsequently calls Span E 204, which is a child span of Span A 202. Note, that all the spans in the trace also comprise the same Trace ID in addition to the Parent Span ID. The Trace ID along with the Parent Span ID may be used to consolidate the spans together into a trace.

3.0 Data Collection

Distributed tracing data is generated through the instrumentation of microservice based applications, libraries, and frameworks. Some common open source instrumentation specifications include OpenTracing and OpenCensus. The instrumentation handles the creating of unique trace and span IDs, keeping track of duration, adding metadata and handling context data. Handling context data, also known as context propagation is critical and is responsible for passing context such as the trace ID between function/microservice calls, thereby, enabling an observer to view the entire transaction at each stop along the way. Context propagation may, for example, be based on Representational State Transfer ("REST"). REST is header-based and requires a transaction to pass headers between service-to-service calls. In order to work properly, all services within a request must use the same context propagation format.

Once the code has been instrumented and context propagation has been implemented using a standard format, the trace data generated by the services can be collected and analyzed to monitor and troubleshoot the microservice based applications generating the trace data.

Figure 3:
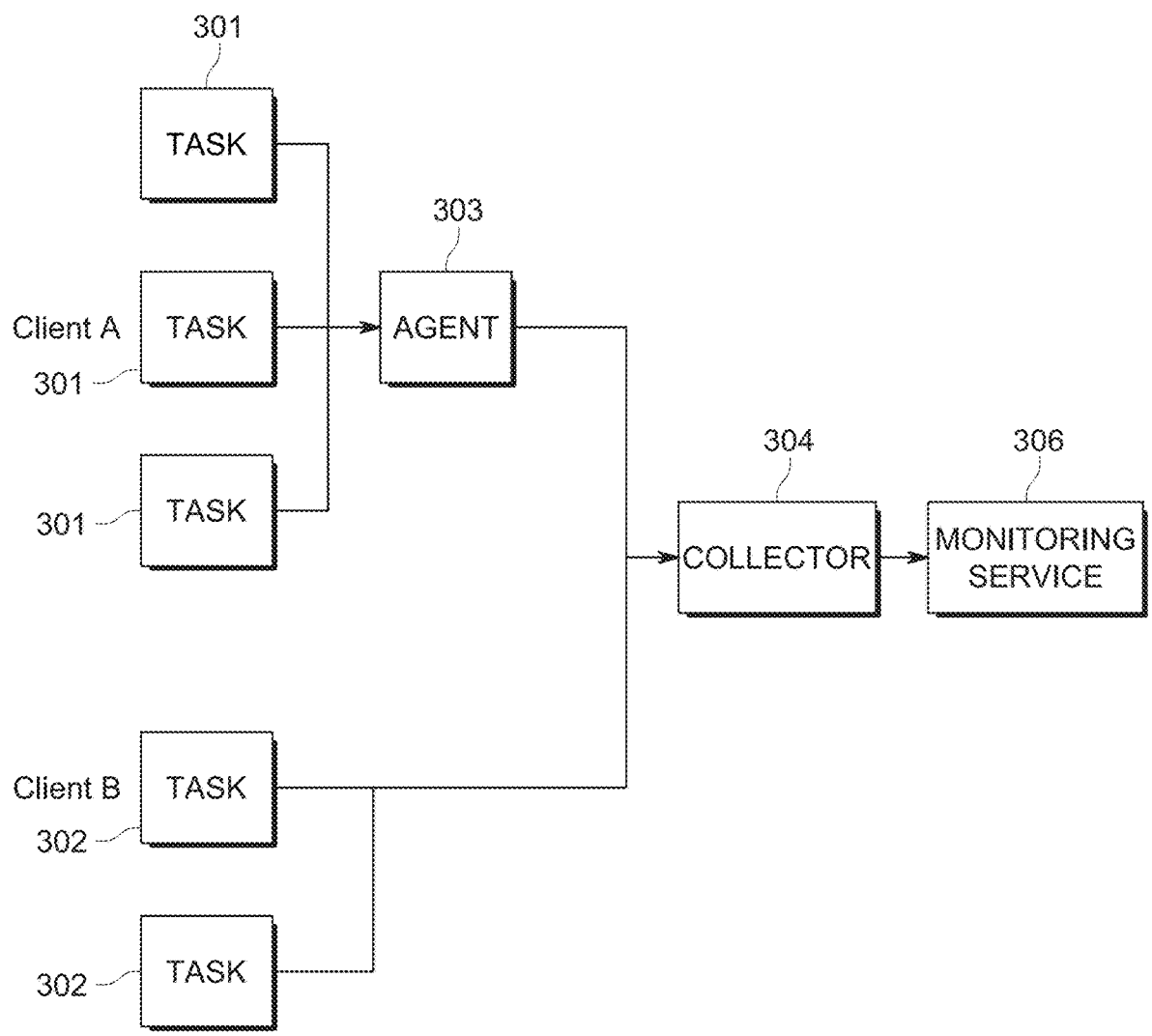
FIG. 3 is a flow diagram that illustrates the manner in which trace data can be collected and ingested for further analysis.

FIG. 3 is a flow diagram that illustrates the manner in which trace data can be collected and ingested for further analysis. Tasks 301 and 302 represent client applications that execute within a client data center. Tasks 301, for example, run inside a client data center for Client A while tasks 302 run inside a client data center for Client B. Tasks 301 or 302 may comprise services or applications within a client's on-premises ("on-prem") software. Alternatively, they may comprise services or applications running in the cloud, e.g., in an Amazon Web Services (AWS) Virtual Private Cloud (VPC).

The tasks 301 and 302 may be instrumented using open source or common commercial tracing libraries (e.g., from tracing applications such as Jaeger or Zipkin), in-house formats, or auto-instrumentation. Each task may be configured to generate spans that describe the processing of a portion of a request as the request traverses through the various tasks (or services) on the client-side.

An agent 303 is typically configured at the client-side host or service for receiving spans collected from the various tasks on the client-side and transmitting the spans to a collector 304. An agent may receive generated spans locally using User Datagram Protocol (UDP). Tasks 302 may comprise instrumented tasks that are not using an agent and may be configured to span directly to the collector 304. While spans can be collected from the client-side tasks without configuring an agent (e.g., in the case of Client B), using an agent can provide benefits including batching, buffering, and updating trace libraries.

Batches of span data collected by agent 303 are received at the collector 304. The collector may be implemented within a client's on-prem software or in the cloud (e.g., in an AWS VPC). Traces often generate duplicative data that is not relevant for monitoring or troubleshooting. Collector 304 avoids redundancies by sampling the data before processing and storing it. The collector 304 runs the span data through a processing pipeline and may store it in a specified storage or analytics backend such a monitoring service 306. Monitoring service 306 receives and analyzes the span data for monitoring and troubleshooting purposes. It should be noted that, in addition to monitoring service 306, tracing data might also be simultaneously transmitted to other types of storage and monitoring back-end services.

Monitoring service 306 may be a Software as a Service (SaaS) based service offering or, alternatively, it may also be implemented as an on-prem application. Monitoring service 306 receives the observability data collected by collector 304 and provides critical insights into the collected trace data to a client, who may be an application owner or developer.

4.0 Using Distributed Error Stacks to Track Error Propagation

Historically, there have been several challenges associated with implementing an analytics tool such as monitoring service 306 within a heterogeneous distributed system. One of the challenges in implementing microservice observability with distributed tracing is pinpointing where errors originated or determining the root cause of an error. In a microservice architecture, an error associated with a particular request may originate in one of the services and might manifest as errors across all the services that participate in that request. For example, a front-end service in a microservice architecture may return errors to the user, but the errors may have originated within a back-end service and propagated upstream through the distributed system to the front-end. Conventional methods of tracing are unequipped to efficiently track the manner in which errors originate and propagate through microservices based applications, and do not provide enough support for diagnosing problems. Further, conventional monitoring tools are inadequate because, among other issues, the alerts generated by the monitoring tools are typically threshold driven and lead to alert storms for the same underlying incident.

Figure 4:
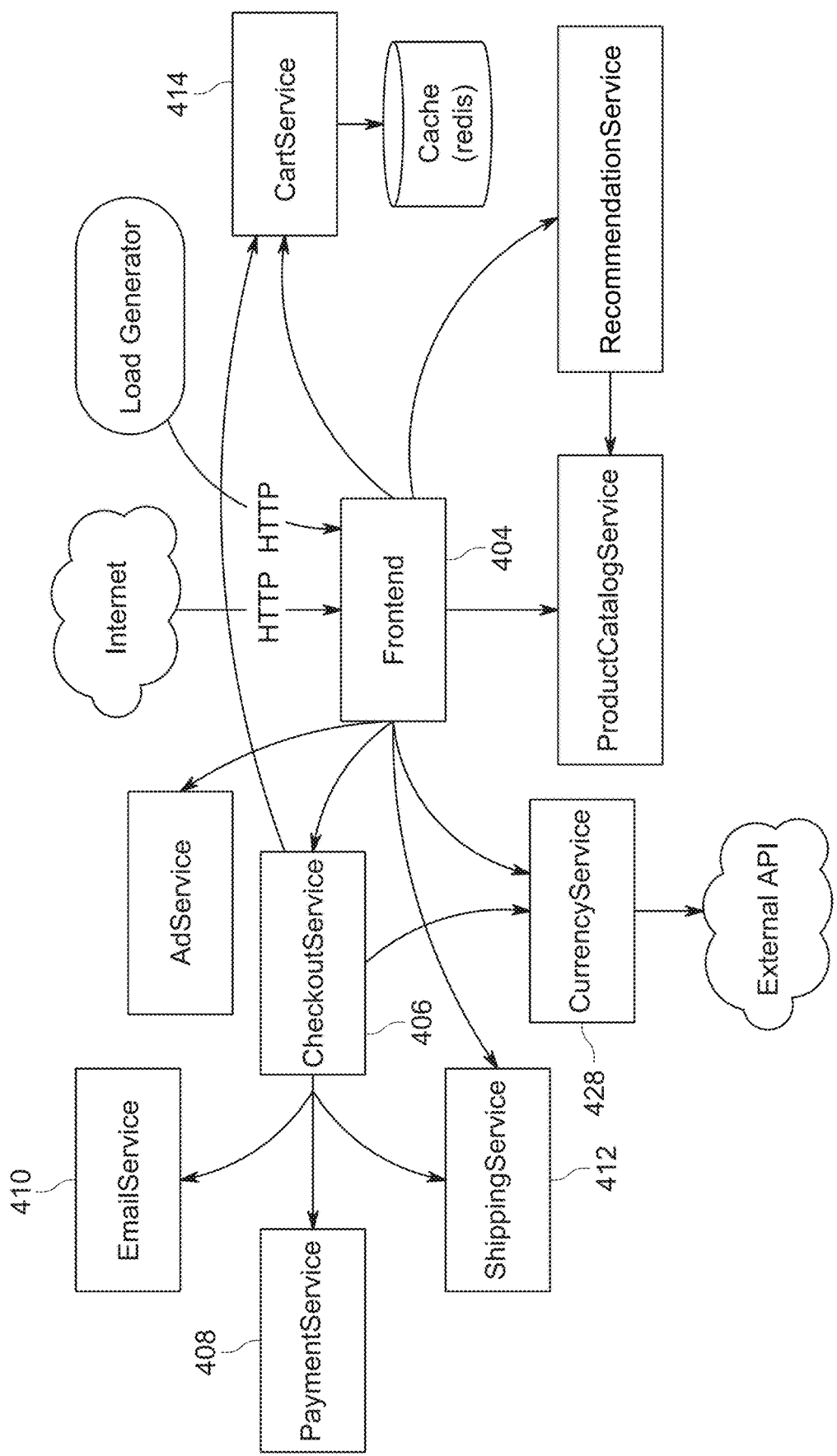
FIG. 4 illustrates an exemplary microservice architecture for an online retailer.

FIG. 4 illustrates an exemplary microservice architecture for an online retailer. A user needing to conduct a transaction may visit the website of the online retailer which would initiate a call to the retailer's Front-end service 404 on a server. The call to the Front-end service 404 may subsequently trigger a chain of calls on the retailer's back-end that would not be transparent to the user. For example, if the user proceeds to complete the transaction by checking out, several calls may be made to the back-end to services such as CheckOutService 406, PaymentService 408, EmailService 410, ShippingService 412, CurrencyService 428 and CartService 414 that may be involved in processing and completing the user's transactions. Note, that any action the user performs on the website would only involve a subset of all the services available and, typically, a single request would not result in a call to all the services illustrated in FIG. 4.

As mentioned above, any request that the user initiates would generate an associated trace. It is appreciated that each user request will be assigned its own Trace ID, which will then propagate to all the various spans that are generated during the servicing of that request. Each service may process a portion of the request and generate one or more spans depending on the manner in which instrumentation is configured for a respective service. The Trace ID may then be used by the server to group the spans together into a trace with that Trace ID. So, for example, the user's checkout transaction may generate a call at Front-end service 404, which may in turn generate calls to various microservices including CheckoutService 406. CheckoutService 406 may, in turn, generate calls to other services such as PaymentService 408, EmailService 410, ShippingService 412. Each of these calls passes the Trace ID to the respective service being called, wherein each service in the call path could potentially generate several child spans.

It should be noted that a service does not necessarily need to make calls to other services—a service may also generate calls to itself (or, more specifically, to different operations and sub-functions within the same service), which would also generate spans with the same Trace ID. Through context propagation then, each of the spans generated (either by a service making a call to another service or a service making a call to various operations and sub-functions within itself) is passed the Trace ID associated with the request. Eventually, the spans generated from a single user request would be consolidated (e.g., by a collector 304 or a monitoring service 306 of FIG. 3) together using the Trace ID (and the Parent Span IDs) to form a single trace associated with the request.

As noted above, conventional distributed tracing methodologies are not equipped to efficiently track the manner in which errors originate and propagate through a microservice architecture such as the one shown in FIG. 4. For example, if an error originates at PaymentService 408, the error may propagate through CheckoutService 406 and display an error message to the user through Front-end service 404. Conventional tracing systems are unable to systematically track the causal chain of events that result in an error or degraded response in a distributed system.

Embodiments of the present invention advantageously allow clients to track the causal chain of operations that resulted in an error or possibly a degraded response being returned to a client in response to a request. Embodiments of the present invention further provide automated analyses that assist application owners and developers in isolating availability incidents and performance bottlenecks. Identifying performance bottlenecks may comprise isolating the component, or layer causing errors or performance issues and the source microservice (including its dimensions or attributes, such as client level, client name, environment type, etc.) causing the errors and outages. Identifying the source microservice(s) of an error is advantageous because often errors propagate upstream without providing any clear indication to an application owner using a monitoring service (such as monitoring service 306) of where the error started. Embodiments of the present invention further help accelerate root-cause analysis by allowing the ability to an application owner or developer to drill down and get further insight into high-level anomalous behavior by providing exemplar traces for the anomalous behavior.

4.1 Full-Context Service Graph

Figure 5:
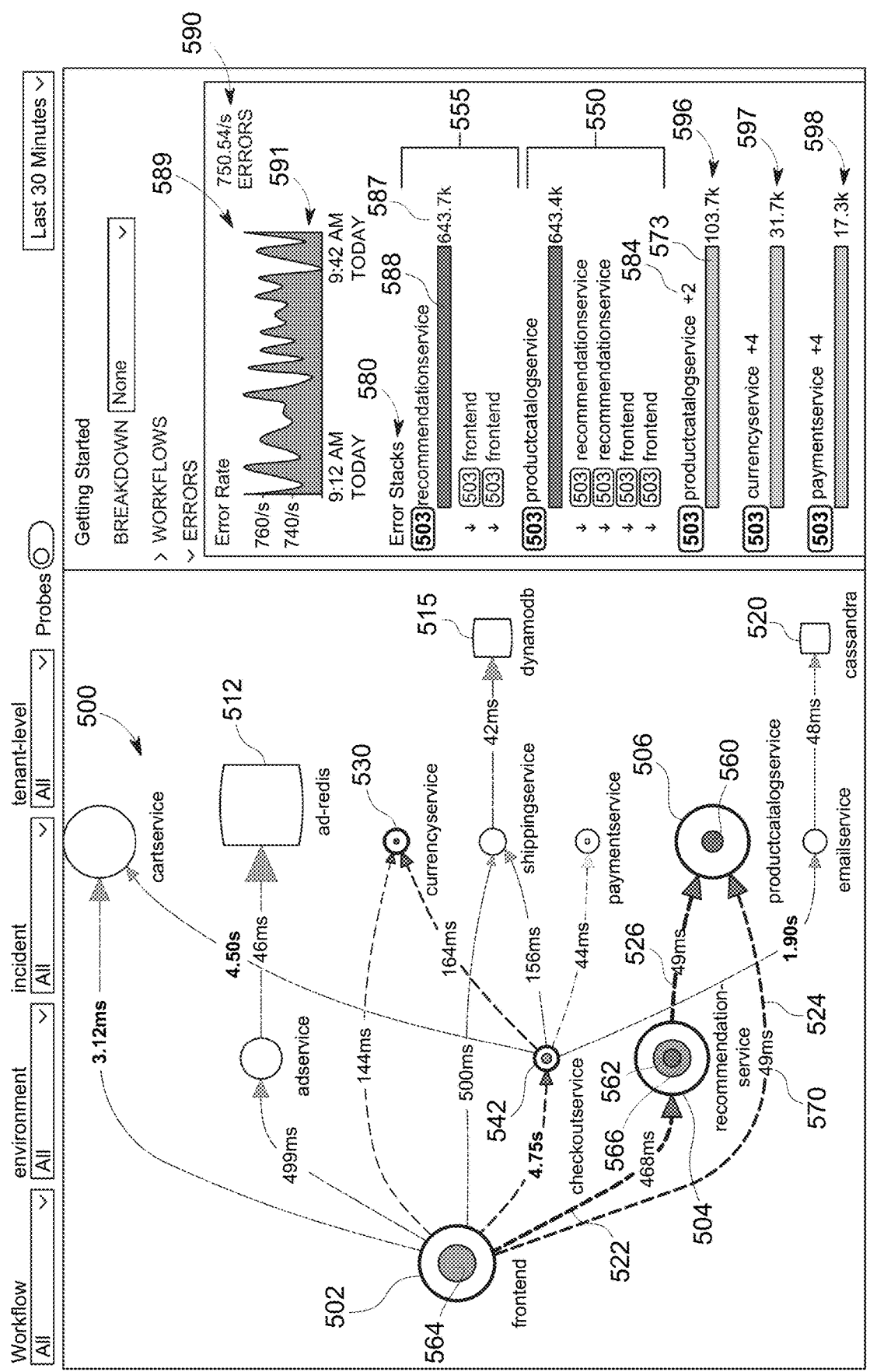
FIG. 5 illustrates an exemplary on-screen GUI comprising an interactive topology graph for an application that facilitates tracking the causal chain of operations resulting in an error in accordance with embodiments of the present invention.

Embodiments of the present invention create a fill-context application topology graph (interchangeably referred to as a "service graph" herein) entirely from distributed tracing information. FIG. 5 illustrates an exemplary graphical user interface ("GUI") comprising an interactive topology graph for an application, which facilitates tracking the causal chain of operations resulting in an error in accordance with embodiments of the present invention.

FIG. 5 illustrates a GUI comprising an interactive fill-context service graph 500, which is constructed for an exemplary microservices-based application using the distributed tracing information collected from, for example, a collector (e.g., collector 304 in FIG. 3). Each circular node, e.g., node 502, 504 and 506 of FIG. 5 represents a single microservice. Alternatively, in an embodiment, a circular node may also represent a group of multiple microservices, where the GUI for the monitoring platform (associated with, for example, monitoring service 306) would provide a client the ability to expand the node into its sub-components. Further, each square node in the service graph 500, e.g., nodes 512, 515 and 520 represents a database.

A user may submit a request at front-end service 502; the user's request at front-end service 502 may set off a chain of subsequent calls. For example, a request entered by the user at the front-end may generate a call from front-end service 502 to recommendation service 504, which in turn may generate a further call to product catalog service 506. As noted previously, a chain of calls to service a request may also comprise calls that a service makes to internal sub-functions or operations within the same service.

Each edge in the service graph 500 (e.g., edges 522, 524 and 526) represents a dependency. Front-end service 502 depends on recommendation service 504 because it calls recommendation service 504. Similarly, recommendation service 504 depends on product catalog service 506 because it makes a call to product catalog service 506. The directionality of the edge represents a dependency of a calling node on the node that is being called. Each of the calls passes the Trace ID for the request to the respective service being called. Further, each service called in the course of serving the request could potentially generate several spans (associated with calls to itself or other services). Each of the spans generated will then carry the Trace ID associated with the request, thereby, propagating the context for the trace. Spans with the same Trace ID are, thereafter, grouped together to compose a trace.

In some embodiments, the GUI comprising service graph 500 may be configured so that the nodes themselves provide a visual indication regarding the number of errors that originated at a particular node versus errors that propagated through the particular node but originated elsewhere. For example, as seen in the service graph of FIG. 5, front-end service 502 makes calls to recommendation service 504. Errors may be generated at recommendation service 504 not only in response to calls from front-end service 502, but also in response to calls that recommendation service 502 makes to itself (e.g., in response to sub-functions or operations that are part of recommendation service). For such errors, recommendation service 504 would be considered the "originator" for the error. Recommendation service 504 also makes calls to product catalog service 506 and these calls may result in their own set of errors for which product catalog service 506 would be considered the error originator. The errors originating at product catalog service 506 may propagate upstream to front-end service 502 through recommendation service 504; these errors would be observed at recommendation service 504 even though recommendations service 504 is not the originator of those errors.

It is appreciated that conventional monitoring technologies would not provide adequate means for a client to distinguish between errors that originated at recommendation service 504 versus errors that propagated through recommendation service 504 but originated elsewhere. The service graph 500 allows clients the ability visualize an overview showing errors that originated at recommendation service 504 as compared with errors that simply propagated through recommendation service 504. As shown in FIG. 5, recommendation service node 504 comprises a solid-filled circular region 566 and a partially-filled region 562, where region 566 represents errors that originated at recommendation service 504 while region 562 represents errors that propagated through service 504 but originated elsewhere (e.g., at product catalog service 506).

Similarly, solid-filled region 560 within product catalog service node 506 represents all the errors that originated at product catalog service. Note that all the errors returned by product catalog service 506 originated at product catalog service. In other words, product catalog service 506 does not have errors from another downstream service propagating through it because it does not make calls to another service that is further downstream in the execution pipeline. Conversely, front-end service 502 only comprises a partially-filled region 564 because all the errors observed at front-end service 502 propagated to it from other downstream services (e.g., recommendation service 504, currency service 530, product catalog service 506, etc.) Front-end service 502 was not the originator of any errors in the example shown in FIG. 5.

In an embodiment, more detailed information pertaining to the errors including distributed error stacks associated with application topology graph 500 may be displayed in a side-bar 589, which will be discussed in detail below.

4.2 Full-Fidelity Service Level Indicators

Embodiments of the present invention are also able to provide clients with full fidelity service level indicators (SLIs) associated with each of the services. The SLIs are aggregated and extracted for the various services in a microservices architecture so that the behavior of applications may be understood. An SLI is a quantitative measure of some aspect of the level of service that is provided. Most clients consider request latency-how long it takes to return a response to a request—as a key SL. Other common SLs include the error rate (often expressed as a fraction of all requests received) and system throughput, typically measured in requests per second. The measurements are often aggregated, e.g., raw trace data is collected over a measurement window and then turned into a rate, average, or percentile.

Referring to FIG. 5, in an embodiment, a client may be able to hover their cursor over various regions of the on-screen displayed service graph 500, including but not limited to the nodes (e.g., 504, 506 etc.) and edges (e.g., 522, 526, etc.), to receive SLI-related information for the associated micorservices through a pop-up window or other interface.

Figure 6:
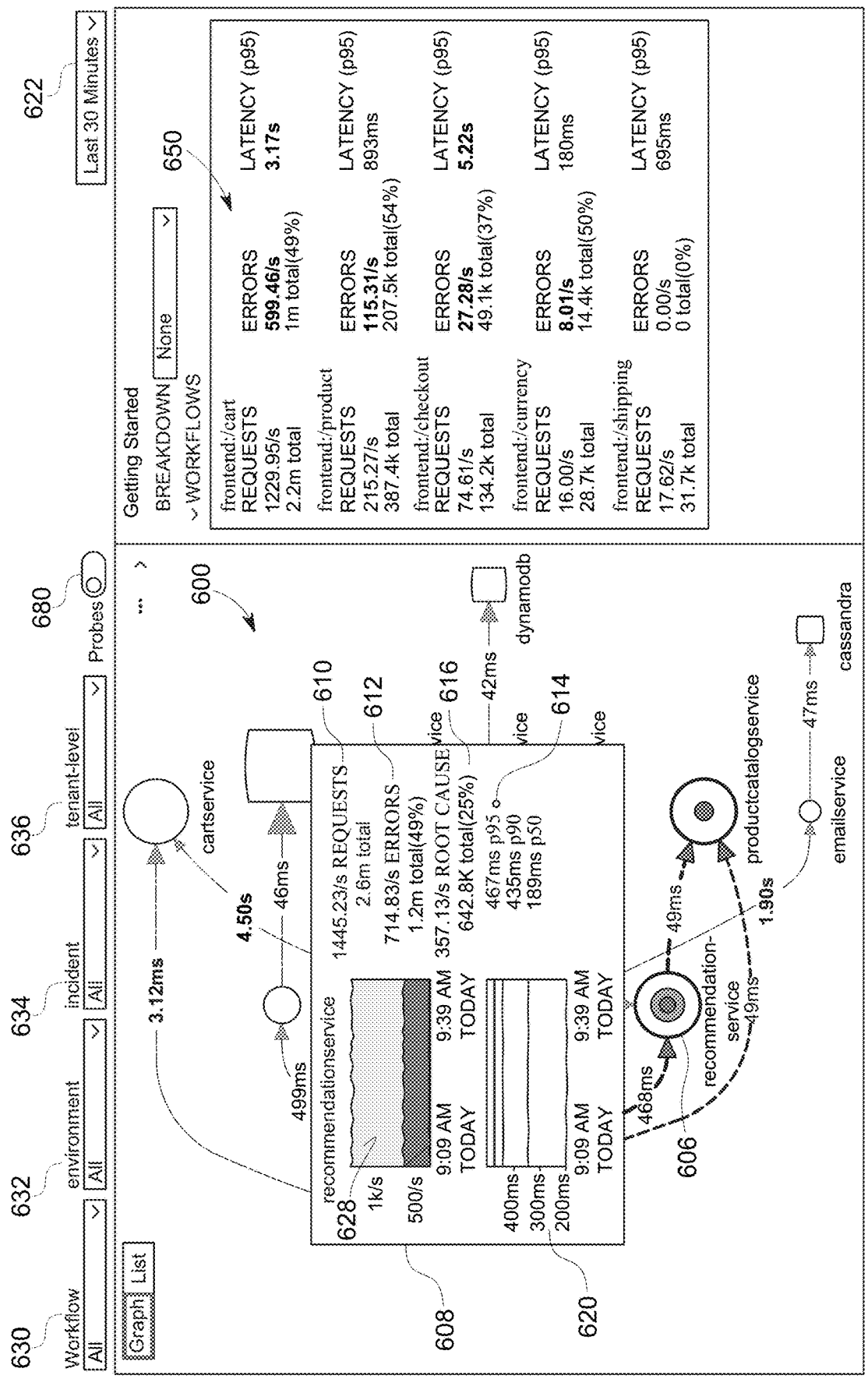
FIG. 6 illustrates an exemplary on-screen GUI showing the manner in which a client can access SLIs pertaining to any service within an interactive topology graph in accordance with embodiments of the present invention.

FIG. 6 illustrates an exemplary on-screen displayed GUI showing the manner in which a client can access SLIs pertaining to any service within an interactive topology graph in accordance with embodiments of the present invention.

As shown in FIG. 6, when a client hovers the cursor over the node associated with, for example, recommendation service 606, a pop-up window 608 is overlaid on the service graph 600 comprising SLIs pertaining to recommendation service 606. Specifically, SLIs pertaining to Requests 610, Errors 612 and Latency percentiles 614 are provided. Furthermore, in an embodiment, information pertaining to Root Causes 616 is also provided to the client.

For example, the Request-related SLIs 610 comprise information regarding the rate of requests and number of requests serviced by recommendation service 606 during a specific time duration. The time duration over which the SLIs are calculated may be adjusted using drop-down menu 622. The time duration over which SLIs are calculated can vary, for example, from 5 minute to 3 days. As indicated by the time axis on graph 628, for this example, a time window of 30 minutes (from 9:09 to 9:39 a.m.) is selected.

In an embodiment, the pop-up window 608 also provides the client information pertaining to Errors-related SLIs 612. In the example of FIG. 6, the pop-up window 608 provides information regarding the error rate and the total number of errors that occurred during the specified time duration. The client is also provided information regarding what percentage of the total number of requests resulted in errors.

In an embodiment, the pop-up window 608 also provides the client information pertaining to Latency-related SLIs 614 and a graphical representation 620 of the same. For example, SLI p95 indicates that for 95% of the users, the latency for servicing the requests was less than 467 ms. Latency-related SLIs also include information regarding p90 and p50 percentiles. Graph 620, in the example of FIG. 6, shows the latency information regarding the p95 percentile graphically.

In one embodiment of the present invention, the pop-up window 608 also displays information pertaining to errors for which the selected service was the root-cause. The Root Cause information 616 includes the number of errors for which the selected service (e.g., recommendation service 606 in the example of FIG. 6) was the originator, the associated error rate, and the percentage of the total number of requests that represents. In this way, embodiments of the present invention are able to help clients distinguish between root cause-related errors and errors associated with downstream causes.

For the example of FIG. 6, there were a total of 2.6 million requests served by recommendation service 606 at a rate of 1445.23 requests/second ("sec"). Of these, 1.2 million of the requests resulted in errors at a rate of 714.83/see, which represents approximately 49% of the total number of requests. From those 1.2 million errors, recommendation service 606 was the root cause of 642.8 k errors, which occurred at a rate of 357.13/sec and represented about 25% of the total number of requests. In this way, embodiments of the present invention enable a client to gather critical SLIs pertaining to the recommendation service 606 including an indication of how many of the errors originated at recommendation service 606.

Figure 7:
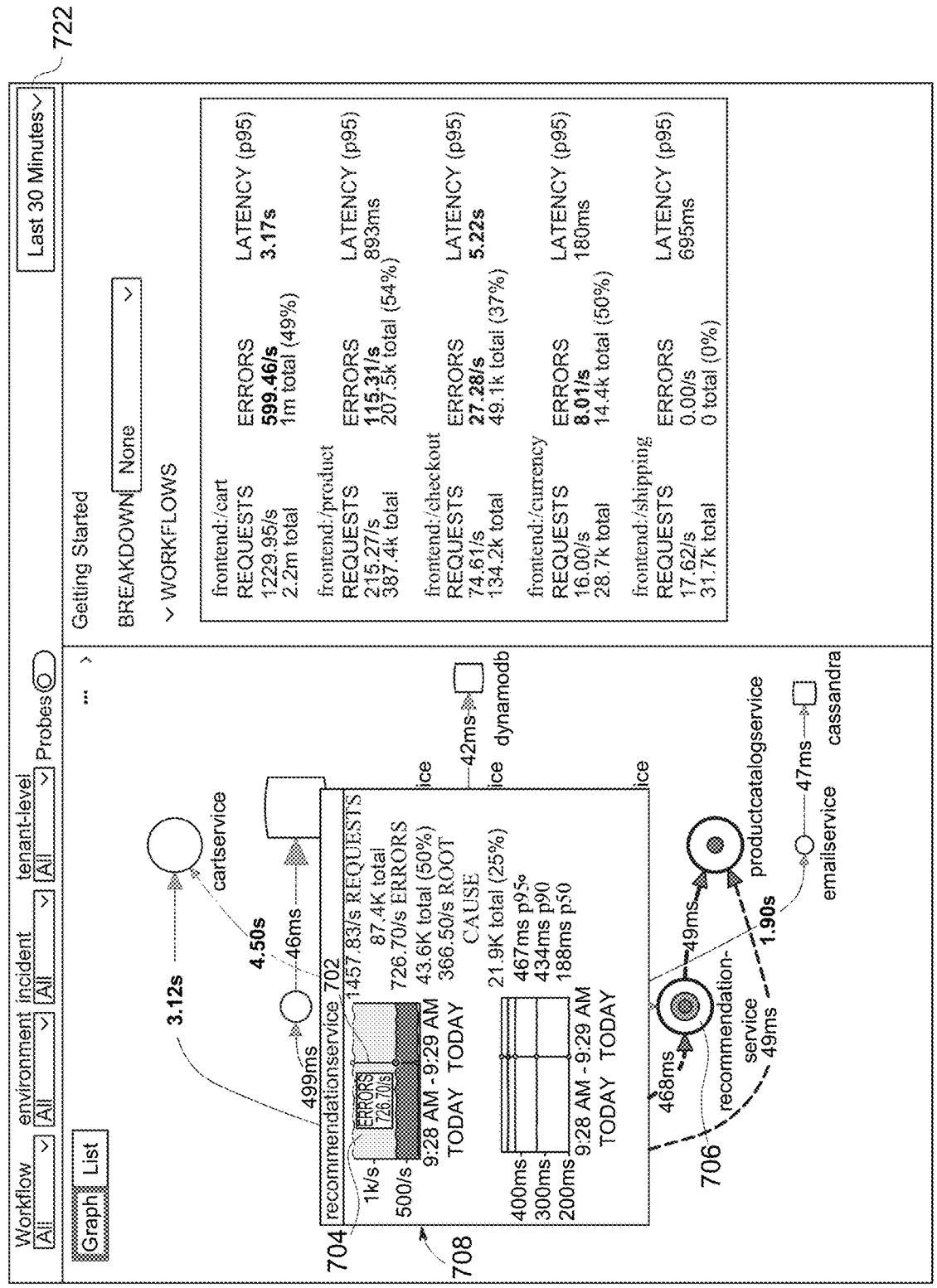
FIG. 7 illustrates an exemplary on-screen GUI showing the manner in which a client may interact with an interactive graphical representation of the SLIs to access further information in accordance with embodiments of the present invention.

FIG. 7 illustrates an exemplary on-screen GUI showing the manner in which a client may interact with an interactive graphical representation of the SLIs to access further information in accordance with embodiments of the present invention.

As mentioned in connection with FIG. 6, a pop-up window 708 may open on-screen when a client hovers their cursor over a node, e.g., recommendation service 706. In one embodiment, a client may access SLIs for more granular time windows by clicking within graph 704. As shown in FIG. 7, by clicking within graph 704, a user is able to obtain SLIs for a 1-minute duration (9:28 a.m.-9:29 a.m.) even though the time duration selected in drop-down box 722 is 30 minutes. In an embodiment, dialog box 708 may comprise a mouse-over effect (or hover effect) for graph 704, thereby, allowing the client to move the bar 702 to various positions on the graph and get information regarding error rate for various points in time.

As seen in FIG. 7, the total number of requests and errors (87.4 k and 43.6 k) during the 1-minute duration is much smaller compared to the corresponding request and error counts seen in pop-up window 608 in FIG. 6. In one embodiment, a client may also be able to double-click within the time-range shown in graph 704 to load an exemplary trace (e.g. a trace associated with the type of error that occurred) for the particular time-period selected. Loading exemplar traces associated with the error activity allows users to determine the type of problem that is prevalent in the environment. As will be discussed further in connection with FIG. 16, loading an exemplary trace opens up a GUI window with a visual representation of the trace allowing a user to get information pertaining to the spans comprising the trace.

Figure 8:
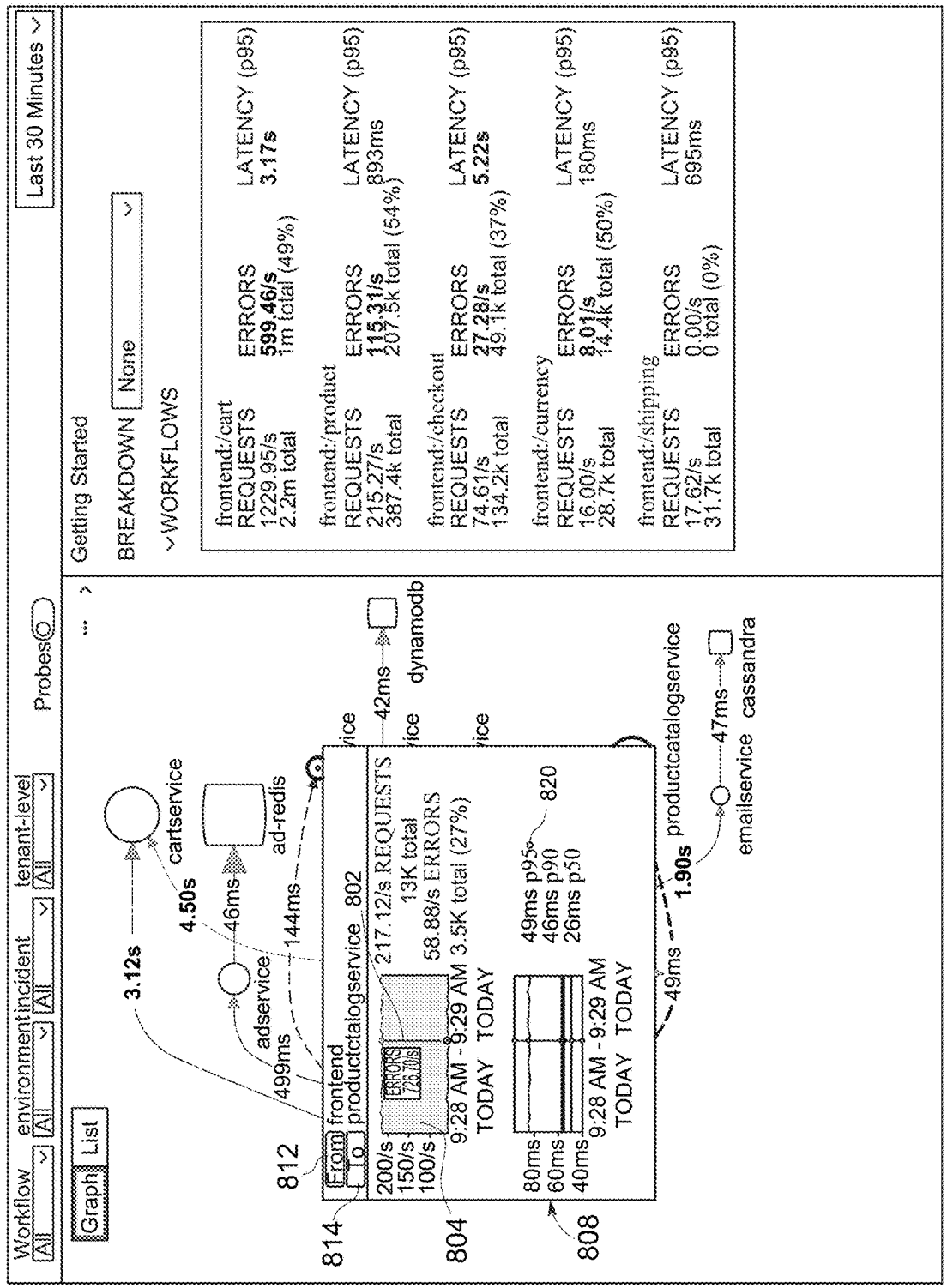
FIG. 8 illustrates an exemplary on-screen GUI showing the manner in which a client can access SLIs pertaining to any edge within an interactive topology graph in accordance with embodiments of the present invention.

FIG. 8 illustrates an exemplary on-screen GUI showing the manner in which a client can access SLIs pertaining to any edge within an interactive topology graph in accordance with embodiments of the present invention. As shown in FIG. 8, if a user hovers over or selects a particular edge, e.g., the edge 524 (as shown in FIG. 5) (which represents the dependency of the front-end service 502 on the product catalog service 506) a pop-up dialog box 808 opens up on-screen that reports SLIs specific to the dependency. The "From" field 812 represents the service that executes the call and the "To" field 814 represents the service that is called (the service that the calling service depends on).

As seen in dialog box 808, SLIs pertaining to number of requests (or calls) that were made, the number of those that returned in errors, and the latency associated with servicing the requests are provided. Further, similar to the feature discussed in connection with FIG. 7, the user has the ability to click at any point within graph 804, which visually represents the SLIs, to obtain performance details for more granular windows of time and to access exemplary traces associated with the dependency. In an embodiment, dialog box 808 may comprise a mouse-over effect for graph 804, thereby, allowing the client to move the bar 802 to various positions on the graph and get information regarding error rate for more granular windows of time.

It should be noted that the latency value 820 of 49 ms shown in FIG. 8 for this particular dependency may be annotated directly on the edge of the service graph. For example, as seen in service graph 500 of FIG. 5, edge 524 of the service graph 500 in FIG. 5 indicates the latency value 570 (e.g., 49 ms) directly on the edge in the service graph allowing a client to efficiently gather information regarding latency associated with the dependency. In an embodiment, as seen in FIG. 5, all the edges within the application topology graph are annotated with their corresponding latency values.

It should be noted that while the terms "mouse-over effect," "hovering the cursor over," "clicking" and "double-clicking" have been used herein to represent well-known GUI interactions exemplary actions that a user may take to access the various features, embodiments of the present invention are not so limited to the user interactions—the features of the disclosed embodiments may be accessed in several different ways, including, but not limited to, keyboard shortcuts, right-clicking and selecting an option from a drop-down menu, selecting objects via touch-screen capability, etc.

In some embodiments, other modes of analysis besides full-fidelity are also supported. For example, a first mode of analysis may comprise a "fast and full-fidelity" mode that supports a fast and full-fidelity analysis for a limited set of tags, e.g., the global tags or attributes of the trace. This mode may be useful for clients that need accurate SLI information for a limited set of high-value tags despite the expensive indexing it may entail. A second mode of analysis may comprise a "fast and approximate" mode that provides fast and approximate SLI information on any dimension of data for clients that want to rapidly analyze problem areas in their application. Further, a third mode of analysis may comprise a "slow and full-fidelity" mode where a full-fidelity analysis can be conducted on any dimension of data (or attribute). The "slow and full-fidelity" mode may sacrifice speed for accuracy, and may be used by clients that need a more thorough analysis across all dimensions. In one embodiment, all three modes may be supported by the monitoring platform simultaneously.

In some embodiments, information gleaned from the computed SLIs may be used to visually represent nodes and edges within a service graph in a way that allows clients to intuit the health of the services and the flow of traffic between services. For example, the service graph 500 of the GUI may be configured to indicate the diminishing health status of a particular node or a particular edge by changing the pattern or shade (or color) of a respective node or edge. A health of a node may be inferred on the basis of how many calls made to a node resulted in an error. Similarly, a health of a dependency (or edge) may be inferred on the basis of how many calls represented by the edge resulted in an error.

Unhealthy nodes (e.g. nodes that fail to meet their Service Level Objectives because they return a high percentage of errors when called) may be represented using a darker shade (or an appropriate color, e.g., red). Further, by way of example, if a particular call to a service results in a high number of errors, the edge associated with the call will also be changed to the darker shade (or appropriate color, e.g. red) or any other visual attribute can be used.

Referencing FIG. 6, node 606 associated with the recommendation service is represented in darker shades (or colors) to indicate that this node was failing to meet its Service Level Objectives (SLOs) (where SLOs comprise a target value or range of values for a service level that is measured by an SLI). This is corroborated by the information in pop-up dialog box 608 (in FIG. 6), for example, where a client can see that of all the requests served by the recommendation service, at least 50% results in errors.

Similarly, referencing FIG. 5, edge 524 may also be represented using a darker shade (or any other visual attribute) also indicating that the associated dependency represented by that edge is also failing to meet its SLOs. This is corroborated by hovering over the edge and checking pop-up dialog box 808 (as shown in FIG. 8), which reports that at least 27% of requests were returning errors. As indicated above, the latency value of 49 ms experienced by requests serviced by product catalog service may also be annotated as element 570 on edge 524 in FIG. 5 (wherein the edge represents the dependency of the front end service 502 on product catalog service 506).

In one embodiment, the GUI for the service graph may be configured so that the thickness of an edge may be dynamic and represent the number of requests flowing between services. Similarly, in one embodiment of the present invention, the size of the node may be dynamic and represent the amount of traffic the node is receiving. For example, front-end service 502, recommendation service 504 and product catalog service 506, all receive more traffic than currency service 530. Similarly, the dependency 522 in FIG. 5 comprises a thicker edge than dependency 524 because front-end service 502 makes significantly more requests to recommendation service 504 than it does to product catalog service 506.

Embodiments of the present disclosure compute full-fidelity SLIs across multiple dimensions in real-time. Further, embodiments of the present invention support high dimensionality and high cardinality tags. In one embodiment, the GUI of FIG. 6 may display one or more attribute categories that comprise dimensions that may be varied across service graph 600. For example, attribute categories, such as categories 630, 632, 634, 636, and 680, may be depicted within the GUI, each of which can correspond to attributes that may be varied to compute SLIs and error-related information for different combinations of the attributes. The categories of dimensions across which the SLIs may be computed, include, but are not limited to, workflow 630, environment 632, incident 634 and tenant-level 636. Each of the categories comprises a drop-down menu with options for the different dimensions as illustrated in FIG. 9.

Figure 9:
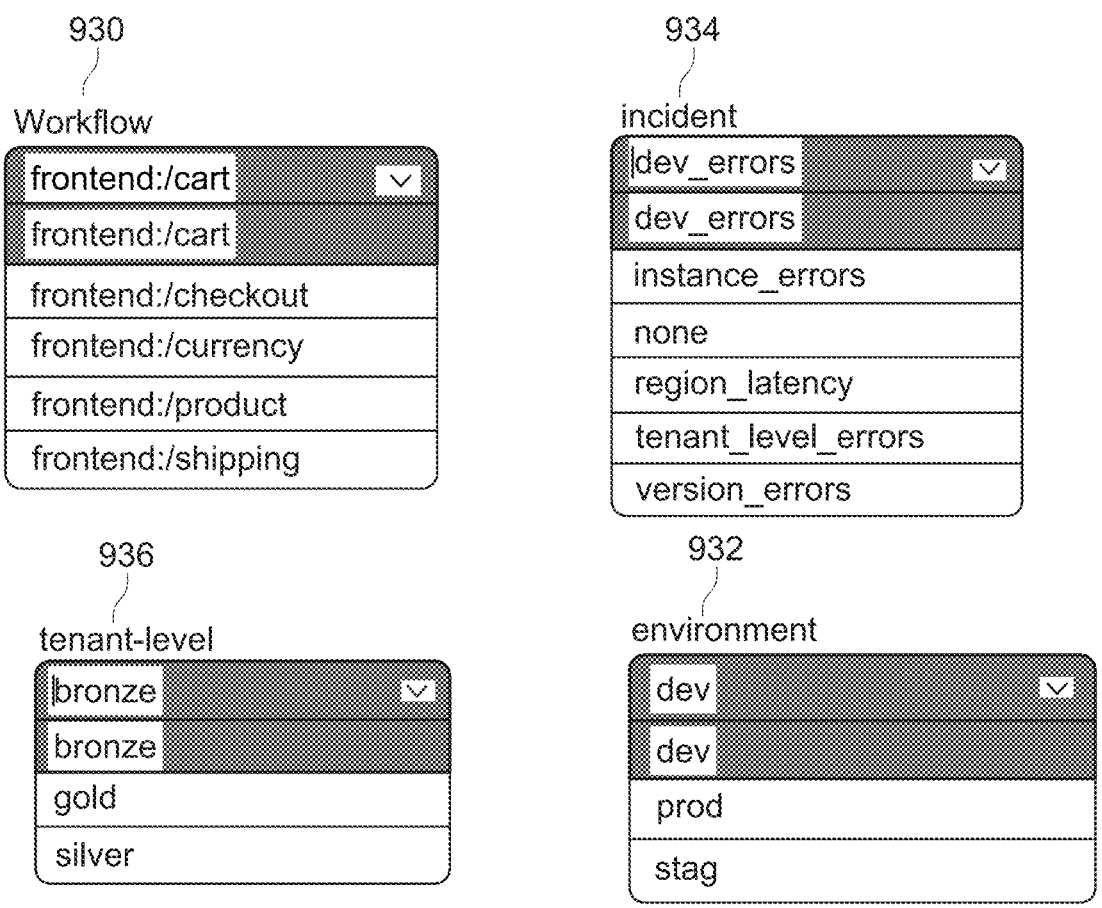
FIG. 9 illustrates exemplary dimensions across which SLIs may be computed in accordance with embodiments of the present invention.

FIG. 9 illustrates exemplary dimensions across which SLIs may be computed in accordance with embodiments of the present invention. Drop-down on-screen menu 930, corresponding to workflow, illustrates different workflows specific to the application discussed in connection with FIG. 5. A "workflow" is a type of dimension or attribute of the request that was processed; a workflow may be conceptualized as a type of "global tag" that is attributed to all the spans in a given trace. A workflow may, for example, be associated with a type of business action, e.g., "checkout," that is generated on the back-end in response to a request.

Similarly, drop down on-screen menus 934, 936 and 932, relating to incident, tenant-level and environment respectively, all provide further dimensions across which SLIs may be computed. SLIs may be computed for each of these dimensions and also for each combination of dimensions. In an embodiment, for each combination of dimensions selected using one or more of the drop-down menus, the client may be able determine the computed SLIs (e.g., by hovering a cursor over the various nodes and edges of the graph after the dimensions have been selected using the drop-down menus shown in FIGS. 6 and 9). In this way, embodiments of the present invention enable a client to slice the application topology graph 500 across several different attributes.

It should be noted that clients might have different attributes or dimensions that may be of interest for their respective application. In an embodiment, the monitoring platform can be configured to provide insight into client-specific dimensions. Consequently, the specific attributes or dimensions available in each of the drop-down menus may vary by client.

Referencing FIG. 6 again, in an embodiment, the GUI may include a sidebar 650 that may display SLIs across the various workflows.

Further, in one or more embodiments, the user may be able to click on any of the interactive graphical representations of the SLIs (e.g., graph 628 in FIG. 6) and load exemplary traces associated with the particular combination of dimensions or attributes selected. The manner in which exemplary traces are loaded and appear in the GUI will be discussed further in connection with FIG. 16.

Figure 10:
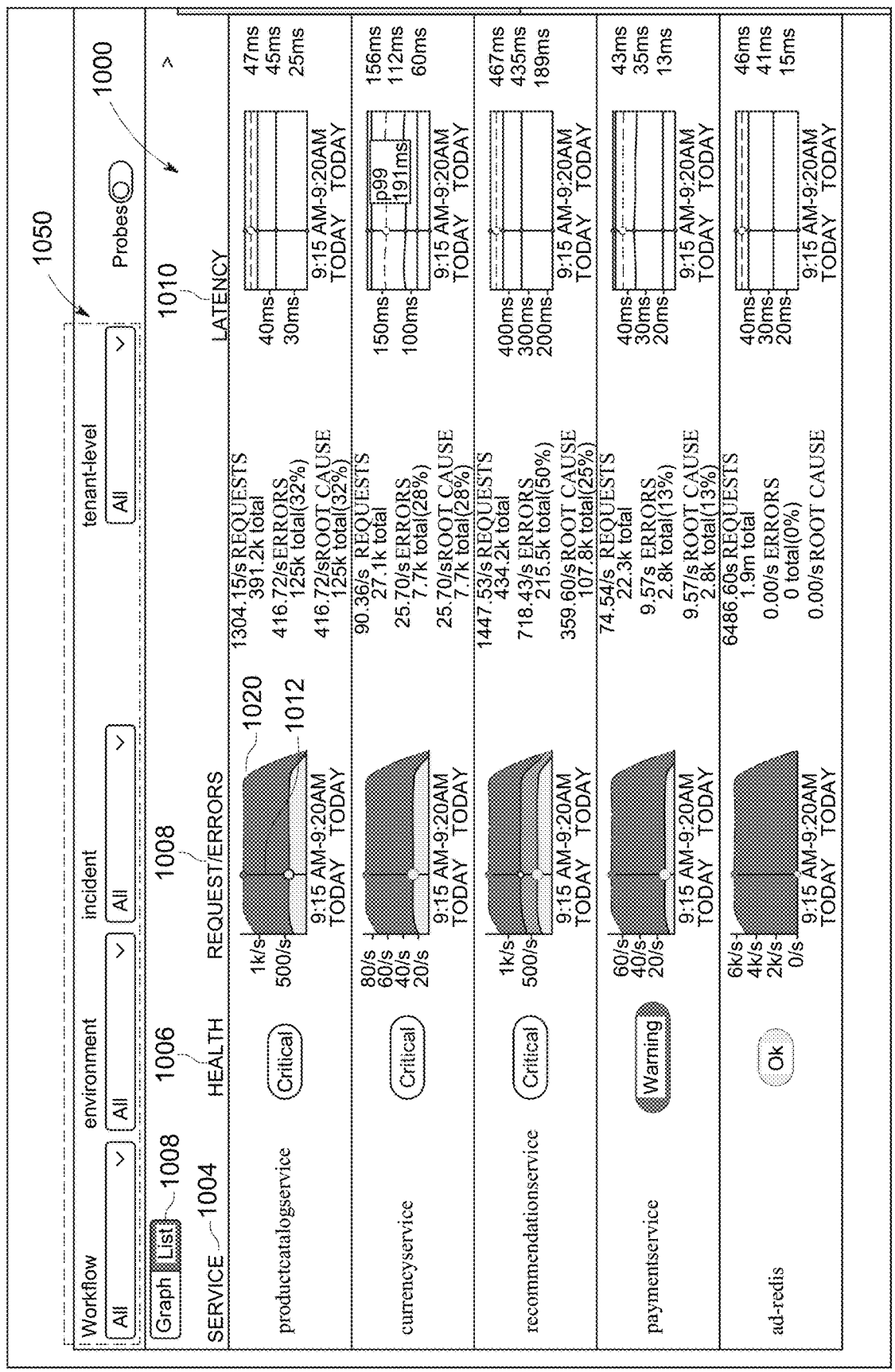
FIG. 10 illustrates an exemplary on-screen GUI showing an alternate method, to the topology graph, of viewing microservices within an application and their associated SLIs in accordance with embodiments of the present invention.

FIG. 10 illustrates an exemplary on-screen GUI showing an alternate method to the topology graph of viewing microservices within an application and their associated SLIs in accordance with embodiments of the present invention. The GUI 1000, as shown in FIG. 10, allows the client to select a list view option 1008 instead of a graphical view such as the one illustrated in FIG. 5. The list view provides the client with a columnar list 1004 of all the services within the application and their corresponding Health status 1006, SLIs (e.g., Requests, Errors) and Root Cause computations 1008, and Latency computations 1010. Along with the SLIs 1008, the client is also provided "Root Cause" computations to allow the client to keep track of errors for which a corresponding service was the originator. The various SLIs and Root Cause computations provided to the user are similar to the computations provided to the user, for example, through dialog box 708 in FIG. 7; the list view of FIG. 10, however, automatically provides the client with SLI-information within the GUI without needing to select or hover over a service-related node.

Further, an interactive graphical view 1020 of the SLIs is also provided, and similar to features associated with graph 704 in FIG. 7, a client is able to click within the graph 1020 and slide the bar 1012 to access further information. Also, a client may be able to double-click at any point in time within the graph to load up exemplary traces associated with the corresponding service.

It should be noted that GUI 1000 also provides the user the ability to select any combination of dimensions through drop-down menus 1050 in order to compute more particularized SLIs for each of the services.

4.3 Distributed Error Stacks

As noted previously, one of the challenges associated with distributing tracing is diagnosing the root cause of error events. Referencing FIG. 5, for example, for an error originating at product catalog service 506 that propagates through recommendation service 504 and eventually comes to the user's attention through front-end service 502, a conventional monitoring service may not provide an application developer adequate detail regarding where and how the error originated. Embodiments of the present invention address this challenge by using trace error signatures, which is a signature that summarizes a type of error encountered during trace execution and provides the application developer insight into the root cause of the failure.

In order to generate distributed error stacks (interchangeably referred to as "trace error signatures"), embodiments of the present invention keep track of and summarize the errors generated by the various services in a microservices-based application for discrete time-ranges. As will be explained further below, embodiments of the present invention subsequently perform a statistical aggregate of the trace error signatures across different traces to keep track of the number of times in a given time window an error associated with each trace error signature occurred.

To keep track of and summarize the errors generated by the various services in a microservices-based application for discrete time-ranges, embodiments of the present invention need to determine error spans associated with a trace. A span generated by a service is considered an "error span" if it represents an operation that returned an error to its caller (e.g., a microservice that made the call that resulted in the error). An error span may be explicitly marked as an error span during the instrumentation process or may be inferred to be an error span based on some type of heuristics, e.g., if inspecting the span tags for a span returns a HTTP status code that is >=400. In one embodiment, the application owner can customize what constitutes an error span by using a query language. For example, the application owner or developer may want to regard only spans that have an HTTP status code >500 as an error span.

A root cause error span is an error span that does not have a child span that is also an error span.

In one embodiment of the present invention, a span error signature (interchangeably referred to as a "span error frame") is created to summarize the type of error returned by the error span to its caller. In order to create a span error signature, embodiments of the present invention map a span to some key attributes that summarize the type of error associated with the span (e.g., a span may either be associated with the root cause originating service for the error or with a service through which the error propagates). An exemplary span error signature may be represented as the following exemplary tuple: {serviceName, operationName, statusCode, isError, isRootCause}, where serviceName represents the name of the service that executes a call resulting in the error span, operationName represents the name of the specific operation within the service that made the call, statusCode represents the status code of the error (e.g., "503"), isError is a 'TRUE/FALSE' flag that indicates whether a span is an error span, and isRootCause is a 'TRUE/FALSE' flag that indicates whether the error span is the root cause error span. It should be noted that the tuple used to represent the span error signature may include other identifying dimensions as well. Furthermore, in alternate embodiments of the present invention, the tuple used to represent a span error signature may contain fewer elements. For example, the tuple may comprise only the serviceName, statusCode, isError and isRootCause elements.

It should be noted that a span error signature may be calculated even for non-error spans, where the error related fields (e.g., isError, isRootCause) may be empty or comprise 'FALSE' values.

In one or more embodiments, trace error signatures are created by identifying one or more root cause error spans associated with a particular trace (from among all the error spans for the trace), determining a call path for each identified root cause error span, and, for each call path identified, mapping each span in the call path to a span error signature.

Figure 11:
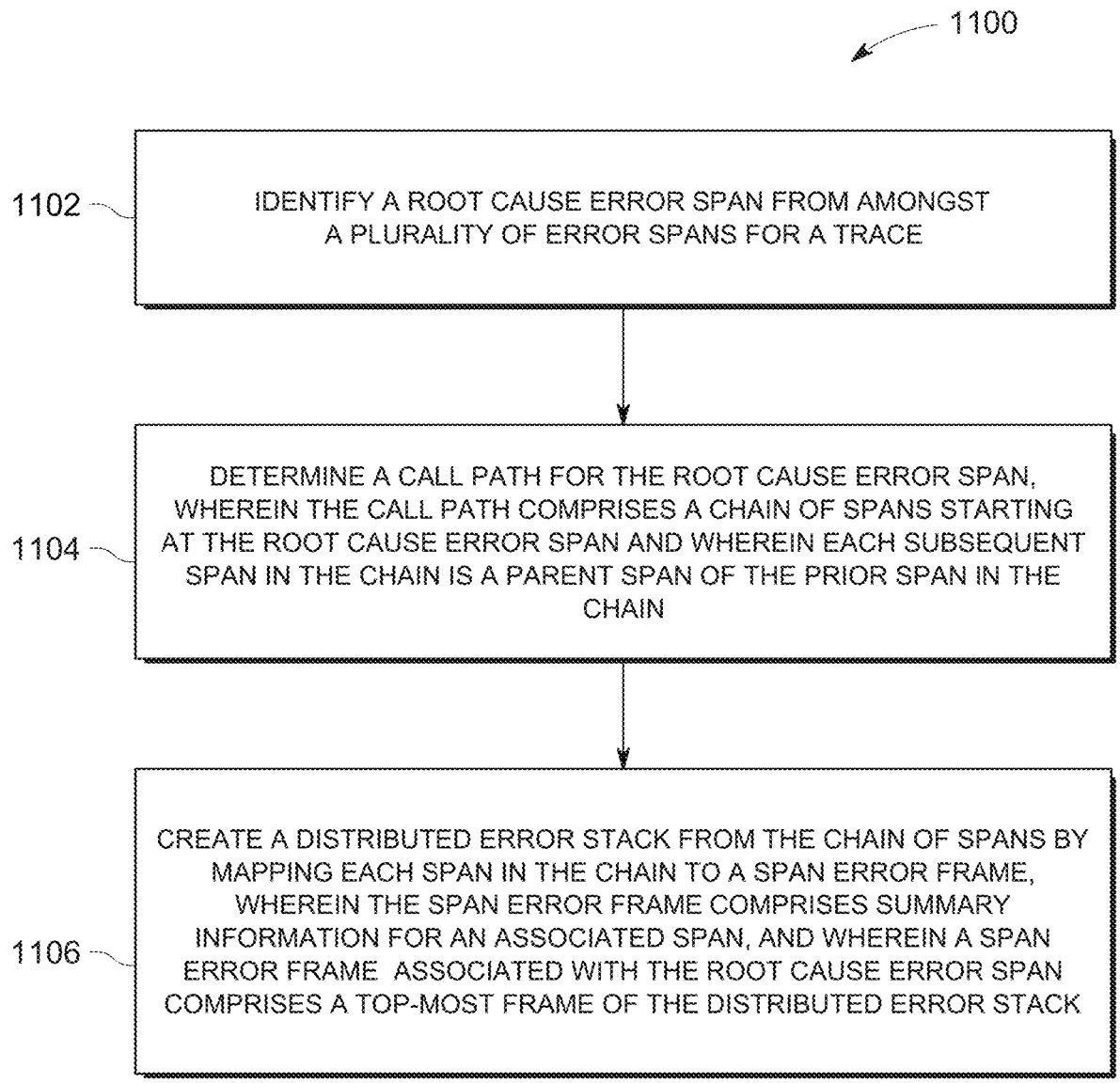
FIG. 11 presents a flowchart illustrating a process to create a trace error signature starting with a root cause error span in accordance with embodiments of the present invention.

FIG. 11 presents a flowchart illustrating a process to create a trace error signature starting with a root cause error span in accordance with embodiments of the present invention. Blocks 1102-1106 describe exemplary steps comprising the process 1100 depicted in FIG. 11 in accordance with the various embodiments herein described. In one embodiment, the process 1100 is implemented at least in part as computer-executable instructions stored in a computer-readable medium and executed in one or more processing devices.

At block 1102, a root cause error span is identified from among a plurality of error spans associated with a particular trace. It should be noted that a single trace can comprise multiple root cause error spans as will be discussed further in connection with FIG. 12.

At block 1104, a call path is determined for the root cause error span, wherein the call path comprises a chain (or series) of spans starting at the root cause error span, and wherein each subsequent span in the chain is a parent span of the prior span in the chain. Stated differently, each subsequent span error signature will belong to the caller of the previous span in the list (e.g., any given span in the chain has a child-of reference to the subsequent span).

In one embodiment, the chain or series of spans starts from the root cause error span and extends to include the last span in the call path that is an error span and has a parent that is a non-error span. In this embodiment, the span error chain ends at the parent of the first non-error span. In other words, the span error chain only comprises spans that are error spans.

In a different embodiment, the chain of spans is extended all the way to the root span of the trace regardless of whether it is an error span or not. Extending the chain all the way to the root span may be beneficial in cases where errors manifest as degraded payload at a service (e.g., a front end service) even if the root span itself is not marked as an error span. In yet another embodiment, different criteria are also possible; for example, the chain may be extended beyond the last non-error parent span but may stop short of the root span of the trace.

At block 1106, a distributed error stack ("or trace error signature") is created from the chain of spans comprising the call path by mapping each span in the chain to a span error frame (the "span error signature"). As mentioned above, a span error signature comprises summary information for an associated span and can be created for both error and non-error spans. The top-most frame of the distributed error stack will belong to the root cause error span and the bottom-most frame will belong to the last span in the chain (which may either be the root span of the trace or the last span in the call path that is an error span, depending on implementation).

Accordingly, a trace error signature is a signature that summarizes a type of error encountered during trace execution. In an embodiment, a trace error signature comprises an ordered list of span error signatures starting from the root cause error span all the way to the last span in the call path that is an error span and has a parent that is a non-error span. Accordingly, the first span error signature in the ordered list or the top-most frame in the distributed stack will belong to the root cause error span. In this embodiment, the bottom-most frame comprises the error signature of the parent of the first non-error span. In a different embodiment, the bottom-most frame of the stack comprises the error signature of the root span of the trace regardless of whether it is an error span or not; this may be done, for example, to provide the developer visibility in instances where intermediary services in a call path may have absorbed an error, but the error still manifests at an upstream service as a degraded or incorrect payload.

A single trace can comprise several trace error signatures, one for each chain of spans (that constitute a call path) extending out from one or more root cause error spans. It should be noted, however, that trace error signatures may be unique even if they share the same call path if, for example, the error status codes returned by a service in response to one or more calls in the call path are different. Accordingly, there may be cases where the call path for two different trace error signatures is identical, but the stacks are unique from each other because one or more spans within the call path of one error stack comprises a different error status code from a corresponding span in the other error stack. For example, two call paths may traverse through the same set of services, but the trace error signature may be unique from each other because a span generated by a service in the first call path may generate an error with a "500" status code while a span generated by the same service in the second call path may generate an error with a "503" status code.

In certain cases, two or more call paths may converge on the same ancestor but comprise different trace error signatures because they start from a different root cause span.

Figure 12:
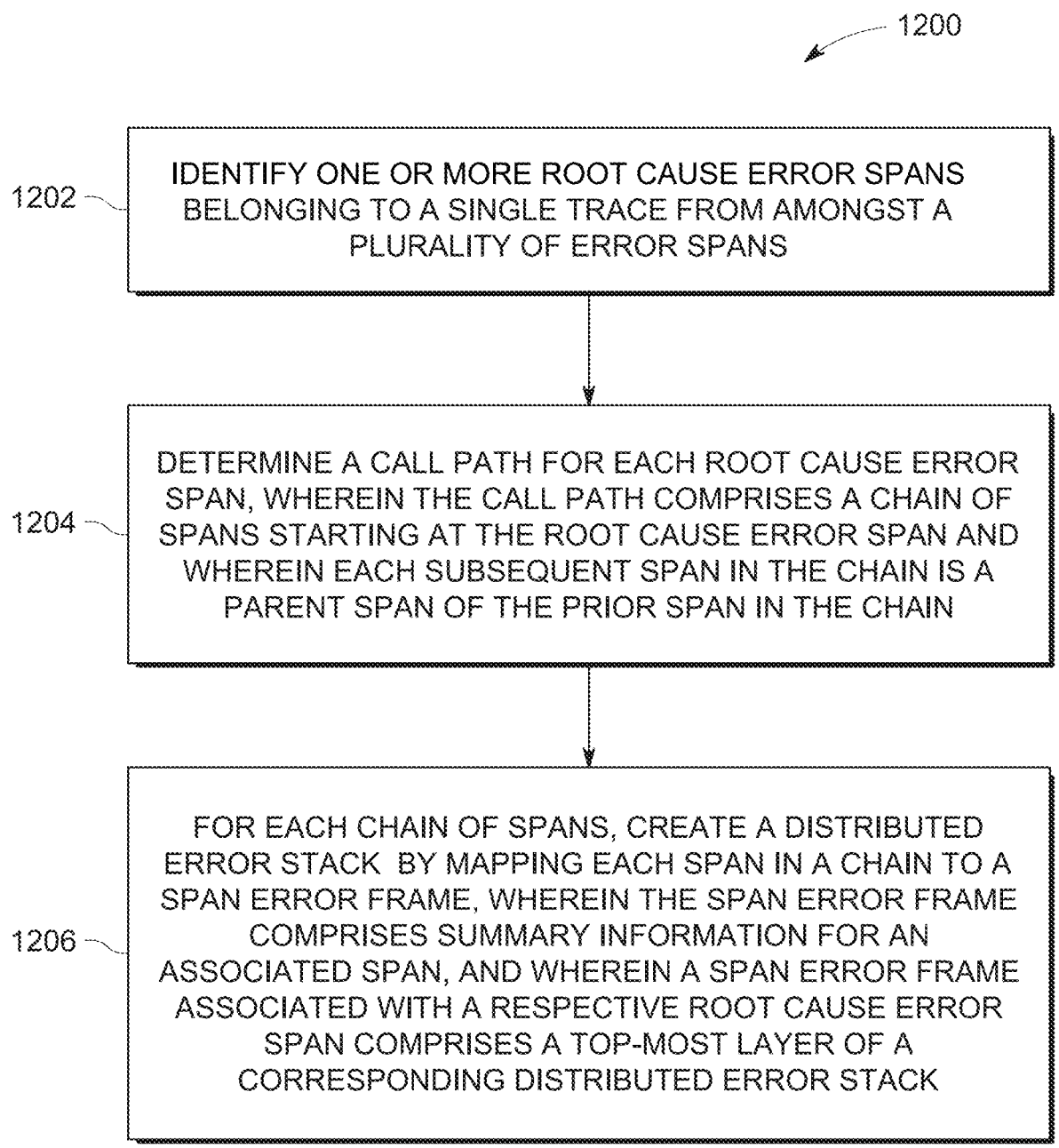
FIG. 12 presents a flowchart illustrating a process for creating trace error signatures when a trace comprises multiple root cause error spans in accordance with embodiments of the present invention.

As noted previously, a single trace may comprise multiple trace error signatures because it may have multiple root cause error spans. FIG. 12 presents a flowchart illustrating a process for creating trace error signatures when a trace comprises multiple root cause error spans in accordance with embodiments of the present invention. Blocks 1202-1206 describe exemplary steps comprising the process 1200 depicted in FIG. 12 in accordance with the various embodiments herein described. In one embodiment, the process 1200 is implemented at least in part as computer-executable instructions stored in a computer-readable medium and executed in one or more processing devices.

At block 1202, one or more root cause error spans belonging to the same trace are identified from among a plurality of error spans. For example, a monitoring service may receive potentially millions of spans from a client. To identify trace error signatures related to a particular trace, one or more root cause error spans comprising a common Trace ID may be identified from the set of incoming spans.

At block 1204, a call path is determined for each root cause error span in the trace, wherein the call path comprises a chain (or series) of spans starting at a root cause error span, and wherein each subsequent span in the chain is a parent span of the prior span in the chain. As noted previously, each chain may extend to include the last span in the call path that is an error span and has a parent that is a non-error span or it may be extended further to include the root span of the trace regardless of whether it is an error span or not.

At block 1206, for each chain of spans determined at block 1204, a distributed error stack ("or trace error signature") is created from each chain of spans by mapping each span in the chain to a span error frame (the "span error signature"). The top-most frame of each distributed error stack will belong to a respective root cause error span for the chain and the bottom-most frame will belong to the last span in the respective chain (which may either be the root span of the trace or the last span in the respective call path that is an error span).

In one or more embodiments, where each service may generate multiple spans, only a single span error frame (or span error signature) is maintained in the distributed error stack for each service even though the service may generate several error spans. The single span error frame that is generated for each service may summarize all the frames generated by that service. This is beneficial in instances where an application owner is primarily interested in monitoring communication between services (and not as interested in calls that a service makes to operations and functions within the same service).

It should be noted that various other alternatives for representing the tuple of information for a span error signature are also possible. For example, in certain embodiments, a client may customize the span error signature. Rather than hard-coded fields, a client may be allowed to project their own desired tags to customize what constitutes a span error signature. By way of example, a client may even include complex expressions evaluated from one or many tags or include regex-based matching on a single tag in the span error signature. In an embodiment, the client may also be provided a GUI through which the client can further customize the span error signature.

Further, in certain embodiments, a client may also be able to customize the trace error signature or distributed error stacks, e.g., by defining a "traversal specification" that indicates exactly how many frames from the call path should be included in the stack and/or whether consecutive spans generated by the same service in the call path should be combined into a single frame.

In an embodiment, the user may be able to customize the trace error signature to include the error message generated in response to a particular error. Thereafter, machine language based intelligent grouping may be able to summarize the error messages to control the cardinality of the signatures.

Referring back to FIG. 5, for example, a user may enter a request at front-end service 502, which makes a call to recommendation service 504, which in turn makes a call to product catalog service 506. If an error originates at product catalog service 506, for example, the error may propagate to recommendation service 504 and eventually to front-end service 502. Assuming the type of error span generated by product catalog service 506 comprises a status code of "503," the monitoring platform may generate a span error signature, which may comprise, among other things, the name of the service generating the error span (e.g., product catalog service 506), an operation name executed by service 506 that generated the error, and the status code "503." An exemplary span error signature created for the error span generated by product catalog service 506 is illustrated in FIG. 13A.

FIG. 13A illustrates an exemplary span error signature in accordance with embodiments of the present invention. Following the format discussed above, the exemplary span error signature or span error frame shown in FIG. 13A is represented as the following tuple: {serviceName, statusCode, isError, isRootCause}, where serviceName=productcatalogservice, statusCode=503, isError=TRUE and isRootCause=True. Note that the error span illustrated in FIG. 13A is the root cause error span because it does not have a child span that is also an error span—as seen in service graph 500 of FIG. 5, product catalog service 506 does not make any downstream calls to other services.

FIG. 13B illustrates an exemplary call path in accordance with embodiments of the present invention. Having identified the root cause error span, as shown in FIG. 13A, a call path may be determined. As noted above, the call path comprises a chain (or series) of spans starting at the root cause error span, and wherein each subsequent span in the chain is a parent span of the prior span in the chain. The chain may end at the last span in the call path that is also an error span (the first non-error parent span) or at the root span of the trace or it may end at the root span of the trace.

In the current example, referencing FIG. 5 again, the user enters a request at front end service 502, which makes a call to recommendation service 504, which in turn makes a call to product catalog service 506. For this particular example, the error propagates all the way to front end service 502 through recommendation service 504; accordingly, the call path comprises the root cause error span "product catalog service," followed by "recommendation service," (parent span of the root cause span) which is followed by "front-end service" (parent span of the span generated by recommendation service). In this example, the call made by front-end service 502 is both the root span of the trace and the last span in the chain that is also the error span.

FIGS. 13C and 13D illustrates two exemplary trace error signatures that may be created from the chain shown in FIG. 13B in accordance with embodiments of the present invention. For the example of FIG. 13C, each span in the call path of FIG. 13B is mapped to a span error signature. Note that each span comprises a "statusCode" with a value of "503." Comparing the trace error signatures of FIGS. 13C and 13D, note that the two error stacks are unique from each other because even though they comprise an identical call path, the statusCode values returned as the error propagates through the intermediary services is different. For example, the stack in FIG. 13D comprises span error signatures (for "recommendation service" and "front end" service) with statusCode values of "500," as compared to status code values of "503" for the span error signatures shown in FIG. 13C.

Referencing FIG. 5 again, the exemplary GUI of FIG. 5 comprises an on-screen error panel 589 that visually displays the overall error rate 590 for the application over a given time duration (e.g., 30 minutes from 9:12 a.m. to 9:42 a.m. as shown on accompanying graph 591) and also displays various distributed error stacks 580 that are aggregated over the same time duration for the application associated with service graph 500. Graph 591 displays the manner in which the overall error rate for the application fluctuates over time. In one embodiment, the graphical representation 591 is interactive, allowing a user to click at any point in time within the graph to gather further information.

Embodiments of the present invention perform a statistical aggregate of the trace error signatures across different traces to maintain the number of times in a given time window an error associated with each trace error signature occurred. Each distributed error stack computed and its associated count is displayed in the error panel 589.

For example, the error panel 589 displays information pertaining to 5 error stacks, recommendation service error stack 555, product catalog service error stack 550, product catalog service error stack 596, currency service error stack 597, and payment service error stack 598.

Two of the error stacks in the exemplary GUI of FIGS. 5, 550 and 555, are expanded so all the frames in the stack are visible to the user. Error stacks may also be collapsed by the client to hide the corresponding frames in each stack. For example, error stacks 596, 597 and 598 are collapsed. For each collapsed stack, the GUI shows a numeric value 584 next to the collapsed stack to indicate the number of frames in the stack.

In an embodiment, each of the error stacks shown in FIG. 5 comprises a heat-map 588 and a count 587 of the number of times that particular type of error occurred during a given time duration. As discussed in connection with FIG. 6, the selected time duration can be adjusted by picking different values from drop-down menu 622. The heat-map 588 is a graphical representation of the error intensity over the selected time duration. Darker shades of the heat-map indicate higher error activity than lighter shades. For example, heat-map 588 is darker than heat-map 573 because heat-map 588 represents 643.7 k errors versus a total of 103.7 k errors associated with heat-map 573. It should also be noted that a heat-map does not have to be a consistent shade of color either—because heat-maps are time-based representations, they may comprise varying shades of color, where darker shades represent durations of high error activity and lighter shades indicate durations of low error activity.

In one embodiment, a client may be provided an interface to filter the distributed error stacks by various criteria. For example, a client may be able to filter and display distributed error stacks that contain only certain specified services. Or, a client, may be able to filter distributed error stacks based on if a particular service is associated with a root cause error span (e.g., show all distributed error stacks where "recommendation service" is the originator.)

All the error stacks 580 provide information about errors that occur within the application topology represented by graph 500 for a given time-range. It should be noted that for the exemplary GUI of FIG. 5, the visual representation of the error stacks may not display all the elements that are comprised within the span error frames for the stack. For example, values associated with the operation name are not shown next to each frame in the visual representation of the stack. For each frame of an expanded error stack in FIG. 5, however, the error status code and the service name are displayed. Note that, as discussed in connection with FIGS. 13A-13D, the error status code and the service name are part of the summary information comprised within the span error frames.

The top-most frame of an error stack, as displayed in the GUI, is associated with the root cause error span. Error stack 550 in FIG. 5, therefore, indicates that the root cause error span is associated with the product catalog service 506. In the exemplary GUI of FIG. 5, frames associated with the root cause error spans indicate the corresponding error status code with a darker shade as compared to the other layers of the stack.

The "503" error status code generated by the product catalog service 506 (for stack 550), for example, propagates upstream to the recommendation service 504 as a "503" error before it finally shows up at the front end service 502 as a "503" error. It should be noted that there are two frames within stack 550 associated with each of recommendation service 504 and front end service 502. As noted previously, often times a service may execute calls to itself (e.g., different operations within the same service). Accordingly, there may be multiple consecutive frames in an error stack associated with a single service.

In an embodiment, only a single error frame may be displayed within the distributed error stack for each service even though the service may make multiple calls to itself. The single span error frame that is created for each service may summarize all the frames generated by that service.

Error stack 555 in FIG. 5 indicates the root cause error span is associated with recommendation service 504 and comprises a "503" error status code (also indicated as a darker shade of color to represent a root cause error originating service). This error propagated upstream through two different operations at front-end service 502 before it reached the user.

Figure 14:
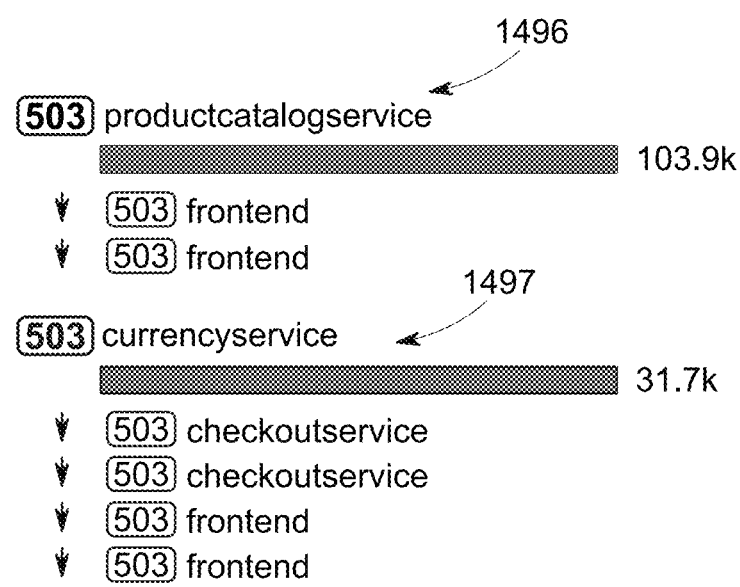
FIG. 14 illustrates two of the stacks discussed in connection with FIG. 5 expanded out to display the associated frames in accordance with embodiments of the present invention.

FIG. 14 illustrates two of the stacks discussed in connection with FIG. 5 expanded out to display the associated frames in accordance with embodiments of the present invention. FIG. 14 illustrates expanded error stacks for error stacks 596 and 597 (which were represented in a collapsed fashion in the exemplary GUI of FIG. 5).

Error stack 1496 in FIG. 14 indicates the root cause error span is associated with product catalog service 506 and comprises a "503" error status code. This error propagated upstream through two different operations at front-end service 502 before it reached the user.

Meanwhile, error stack 1497 in FIG. 14 indicates the root cause error span is associated with currency service 530 and comprises a "503" error status code. This error propagated upstream through two different operations at check out service 542 and two different operations at front-end service 502 before it reached the user.

The on-screen GUI of FIG. 5 allows a client to visually correlate the error stack with the service graph to efficiently determine from where the errors are originating and the manner in which they are flowing through the application. For example, given error stack 550, a client may visually inspect the path that the error takes through the application. Referring to service graph 500, a client may note that the error originates at product catalog services 506 and propagates to recommendation service 504 through edge 526 and, subsequently, to front end 502 via a call represented by edge 522.

Similarly, for error stack 555, a client may visually take note that an error originating at recommendation service 504 may propagate to front end service 502 via edge 522.

For error stack 1496 (the expanded view of error stack 596 in FIG. 5), a client may visually examine service graph 500 and note that front end service, in certain instances, calls product catalog service 506 directly via edge 524 (rather than through recommendation service 504). Accordingly, error stack 1496 has a unique trace error signature as compared with stack 550.

Finally, for error stack 1497 (the expanded view of error stack 597 in FIG. 5), a client may be able to corroborate that front-end service 502 makes a call to checkout service 542, which in turn makes a call to currency service 530. The error, therefore, propagates upstream from currency service 530 through checkout service 542 to front-end service 502.

Conventional monitoring tools do not provide application owners clear indications of where an error started. For example, conventional monitoring tools would not be able to differentiate errors associated with error stack 550 as compared with error stack 1496 (represented as collapsed stack 596 in FIG. 5). Both errors originate at product catalog service 506, but they follow different call paths as they propagate upstream to front-end service 502.

Similarly, conventional monitoring tools may also not be able to distinguish between errors associated with error stack 555 as compared with error stack 550. Both types of errors terminate at front-end service providing an error status code of "503." Nevertheless, the error associated with stack 555 originates at recommendation service 504 while the error associated with stack 550 originates at product catalog service 506. Without the root cause analysis capabilities provided by embodiments of the present invention, a user may not be able to distinguish between the two different originators of errors.

In some embodiments, the error stacks 580 may be filtered and grouped across multiple dimensions. As discussed previously, embodiments of the present invention support high dimensionality and high cardinality tags providing a developer the ability to analyze the distributed error stacks 580 across several dimensions of data, e.g., multiple categories of dimensions including, but not limited to, workflow 630, environment 632, incident 634 and tenant-level 636 (as discussed in connection with FIG. 6), including the various associated dimensions (as discussed in connection with FIG. 9). The ability to filter the error stacks across multiple dimensions advantageously provides clients with powerful analytical capabilities to identify performance bottlenecks by giving them the ability to isolate various components or layers that may be causing errors or performance issues and the source microservice causing errors and outages.

By helping clients summarize the errors occurring in the environment over a requested time range and different dimensions, embodiments of the present invention advantageously help the clients prioritize investigations and effort based upon the frequency, impact and possibly unusualness of the errors.

Using the dynamic application topology graph 500, the distributed error stacks 580, and the various associated features, embodiments of the present invention advantageously enable a client to visually analyze the entire application and provide actionable insights that greatly accelerate problem isolation and root cause analysis while preserving context as an application owner navigates through the monitoring platform. The service graph 500 provided by embodiments of the present invention is constructed entirely using distributed tracing information. The service graph 500 also supports high dimensionality and high cardinality tags providing a developer the ability to advantageously analyze the graph across several dimensions of data (e.g., multiple categories of dimensions including, but not limited to, workflow 630, environment 632, incident 634 and tenant-level 636 as discussed in connection with FIG. 6). Additionally, the service graph provides several key health indicators overlaid on each node providing the user the ability to efficiently perform a root cause failure analysis across the entire architecture.

Furthermore, embodiments of the present invention, unlike conventional monitoring services, are able to ingest 100% of all incoming traces in real-time using a streaming pipeline, where the ingested traces are used to construct the service graph and distributed error stacks, and provide other analytics information.

Figure 15:
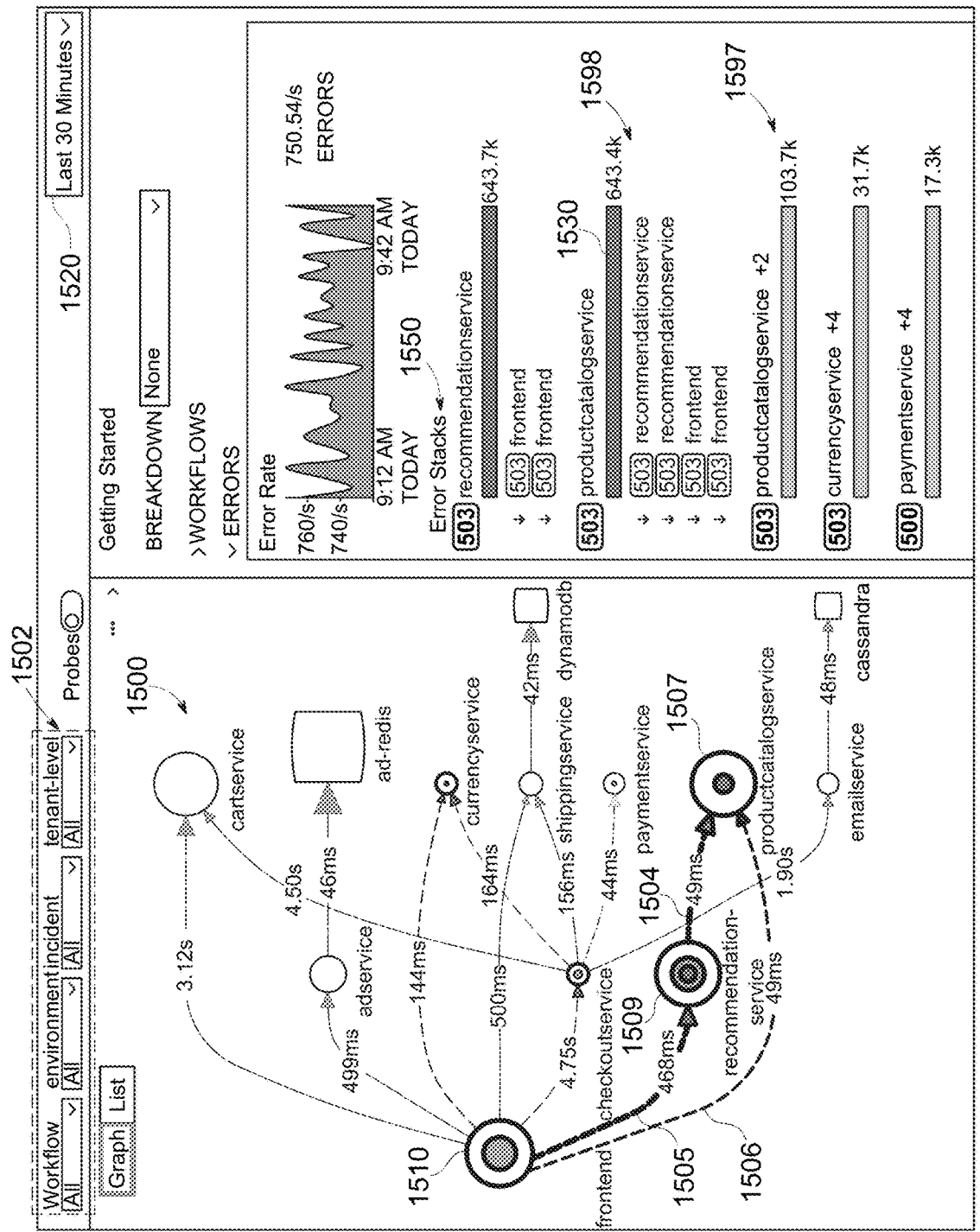
FIG. 15 illustrates an exemplary on-screen GUI showing the manner in which the application topology can visually indicate a trace associated with a selected error stack in accordance with embodiments of the present invention.

FIG. 15 illustrates an exemplary on-screen GUI showing the manner in which the application topology can visually indicate a trace associated with a selected error stack in accordance with embodiments of the present invention.

As also discussed in connection with FIG. 5, the exemplary on-screen GUI shown for FIG. 15 comprises an on-screen service graph 1500 with associated distributed error stacks 1550 displayed alongside the service graph 1500. Both the service graph 1500 and the distributed error stacks 1550 can be analyzed across multiple different dimensions of data in accordance with embodiments of the present invention. As previously discussed in connection with FIGS. 6 and 9, drop-down menus 1502 provide a range of different dimensions, and the service graph 1500 and error stacks 1550 may be analyzed across one or more different combinations of these dimensions for a given duration of time (selected using exemplary drop-down menu 1520).

Referencing FIG. 6, for example, a user may want to see all the error stacks and their associated metrics (e.g., count) for "tenant-level=gold" where the "environment=prod" for the "last 30 minutes" (as selected using drop-down menu 1520). Alternatively, the user may want to view error stacks associated with different workflows, e.g., "frontend:/checkout" or "frontend:/cart." In this way embodiments of the present invention are able to pinpoint error causality across multiple dimensions and services, and in time.

In an embodiment, a user can hover a cursor over or select a particular error stack, which results in the accompanying service graph 1500 brightening or otherwise highlighting the nodes and edges associated with the trace for the selected error stack (while dimming other nodes and edges). As shown in the exemplary GUI of FIG. 15, if the client, for example, selects or hovers over error stack 1598, the call path associated with error stack 1598 will be highlighted while the remaining nodes and edges in graph 1500 will be dimmed. Accordingly, nodes (e.g., 1510, 1509, 1507) and edges (e.g., 1505, 1504) associated with error stack 1598 (where product catalog service 1507 is the error originator and front end service 1510 is the ancestor node the error propagates to) are highlighted.

Note that, in an embodiment, edge 1506 may also brightened in FIG. 15 even though edge 1506 is associated with a different error stack 1597. Because both error stacks 1597 and 1598 may be extracted from the same trace, the service graph 1500 will highlight all the nodes and dependencies associated with the trace. This feature allows a client to use the service graph 1500 to visually ascertain whether one or more error stacks are related, and also to inspect the call paths for the error stacks. In this way embodiments of the present invention advantageously provide a visual experience to a client that is aligned with a client's intuitive model of the application.

In accordance with some embodiments, a client is provided the capability of loading up exemplar traces for each distributed error stack. For example, in an embodiment, a client may be able to click at any point of time within a given heat-map (e.g., heat-map 1530) to load up an exemplar trace.

Figure 16:
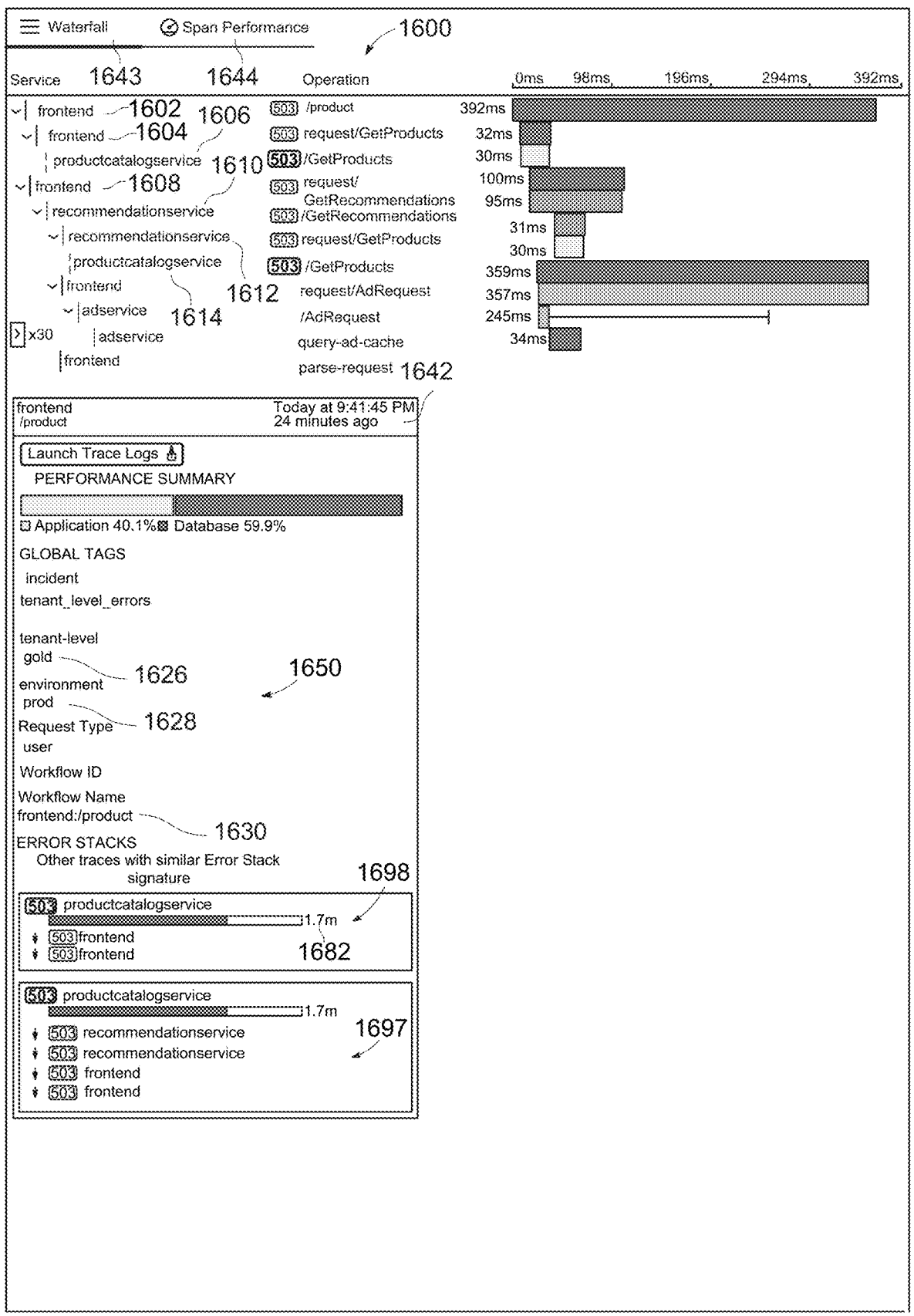
FIG. 16 illustrates an exemplary on-screen GUI showing a visual representation of the exemplary trace highlighted in the service graph of FIG. 15 in accordance with embodiments of the present invention.

FIG. 16 illustrates an exemplary on-screen GUI showing a visual representation of the exemplary trace highlighted in the service graph of FIG. 15 in accordance with embodiments of the present invention. Note that the client is given options to view this trace using a "waterfall" view 1643 or by "span performance" 1644. The exemplary trace representation of FIG. 16 is generated in accordance with a client selection of the "waterfall" view option 1643.

Trace 1600 of FIG. 16 may be loaded, for example, when a user double-clicks a particular point in time within heat-map 1530. Trace 1600 is an exemplary trace associated with both error-stacks 1597 and 1598. The GUI of FIG. 16 indicates a time 1642 for when this particular exemplar trace was captured. As seen in FIG. 16, the loaded trace 1600 is associated with two unique trace error signatures. A client is visually able to determine that the trace comprises two unique error stacks (e.g., associated with root cause error spans 1606 and 1614) because the error status codes "503" returned by spans 1606 and 1614 are displayed highlighted with a different pattern or darker shade of color (or any other attribute) as shown in FIG. 16 as compared to the other spans in the trace. Error status code displayed with lighter shades or patterns indicate that the associated error spans received the error from another span and are not root cause error spans.

Note that even though both error spans 1606 and 1614 are generated by product catalog service, they are associated with different respective error stacks because the call path for each is different. For example, the call path associated with error stack 1597 (as seen in FIG. 15) starting at the root span for the trace is as follows: "frontend" service executing operation "/product" (generating root span 1602) makes a call to operation "request/GetProducts" within "frontend" service (generating span 1604), which in turn makes a call to operation "/GetProducts" within "product catalog service," which ends up generating the root cause error span 1606. Referring to service graph 1500, it is clear that this call path is associated with nodes 1510 and 1507, and edge 1506.

Similarly, the call path associated with error stack 1598 starting at the root span for the trace is as follows: "frontend" service executing operation "/product" (generating root span 1602) makes a call to operation "request/GetRecommendations" within "frontend" service (generating span 1608), which in turn makes a call to operation "/GetRecommendations" within "recommendation service," (generating span 1610), which then makes a call to operation "request/GetProducts" within "recommendation service," (generating span 1612), which finally makes a call to operation "/GetProducts" within "product catalog service" thereby generating root cause error span 1614.

Note that the operation and the service that generates the root cause error spans 1606 and 1614 are the same (namely operation "/GetProducts" within service "productcatalogservice"), but they are associated with different error stacks because the call path for each is different. Referring to service graph 1500, it is clear that the call path for root cause error span 1614 is associated with nodes 1510, 1509 and 1507, and edges 1505 and 1504.

The exemplary GUI of FIG. 16 also shows an expanded view of the two trace error signatures 1698 and 1697 associated with the trace 1600. (Note that these are the same trace error signatures as 1597 and 1598 of FIG. 15). Note that the error stacks 1698 and 1697 may have different error counts 1682 associated with each that may be displayed alongside the error stack in the GUI.

Further, note that for each span, the GUI of FIG. 16 includes a visual indication of the total span length, e.g., root span 1602 is 392 ms long.

The exemplary GUI of FIG. 16 also illustrates that trace 1600 is associated with several global tags 1650, e.g., tenant-level tag 1626, workflow 1630, and environment tag 1628. As noted previously, with global tags, even if one span in the trace is associated with a particular global tag, the tag can be attributed to all the other spans in the same trace. The global tags associated with a particular trace allows a user to filter and group error-related information and SLIs across several different dimensions of data (as discussed in connection with FIGS. 6 and 9).

Note that loading exemplar traces associated with a particular error stack advantageously allows users to gather further information regarding a type of problem that is prevalent in the environment. In conventional monitoring platforms, the user is unable to determine whether an error is caused by a one-off trace or is an example of behavior that is prevalent in the environment.

Figure 17:
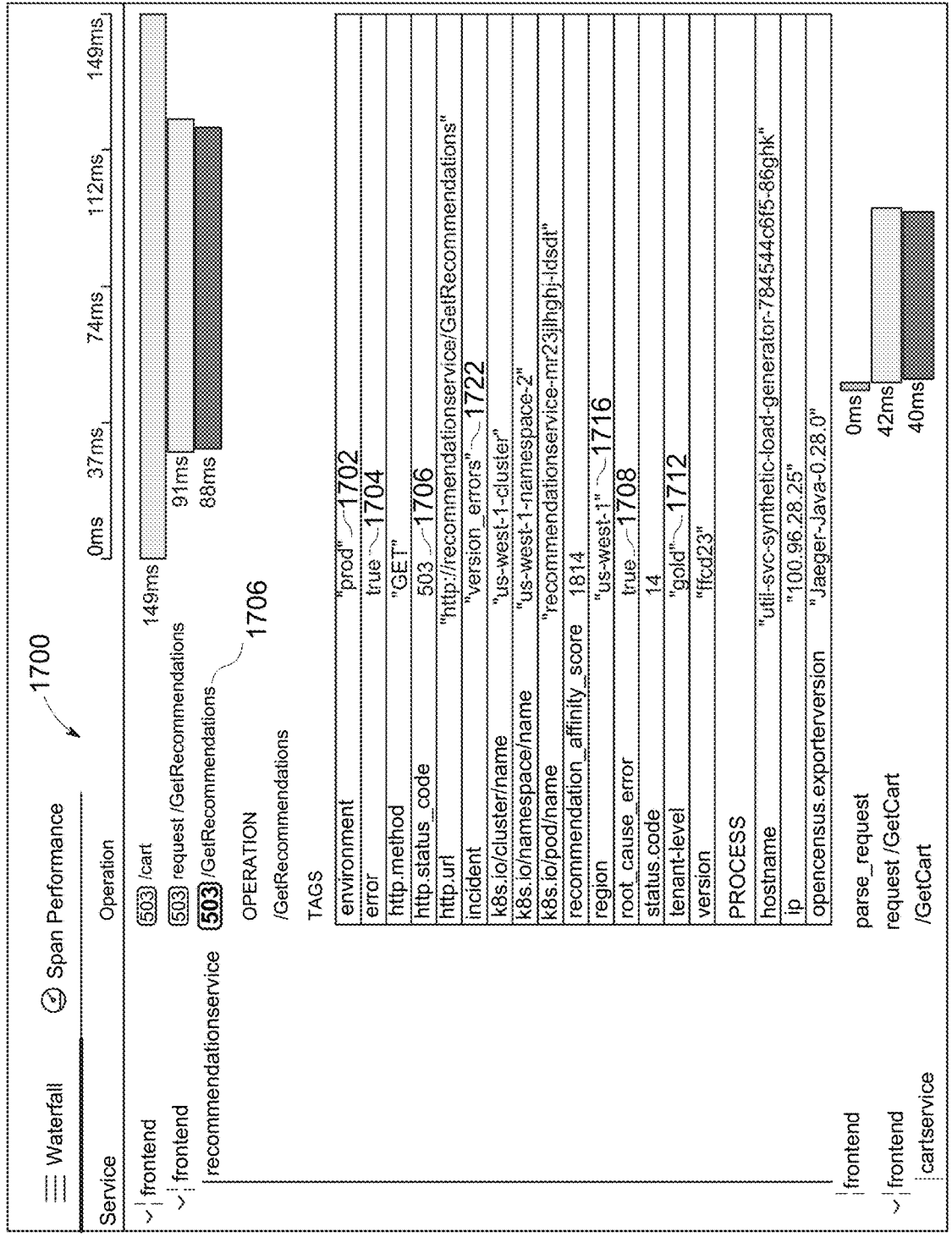
FIG. 17 illustrates the manner in which each span within a trace may be expanded to view its associated tags in accordance with embodiments of the present invention.

FIG. 17 illustrates the manner in which each span within a trace may be expanded to view its associated tags in accordance with embodiments of the present invention.

The exemplary trace 1700 illustrated in FIG. 17 comprises root cause error span 1706 associated with "recommendation service." In an embodiment, each span in the trace may be expanded to view its associated tags.

The tags associated with each span may be global tags, service-level tags or span-level tags comprised within a span error frame. For example, tag 1702 ("environment"="prod"), tag 1722 ("incident"="version_errors"), and tag 1712 ("tenant"="gold") are global tags, which are associated with a user request. Global tags associated with any span in trace 1700 can be attributed to all the spans within trace 1700. Accordingly, the values for tags 1702, 1722 and 1712 may be inherited by all the spans in trace 1700. Other types of tags, e.g., service-level tags, do not share the inheritance property of global level tags. For example, service-level tag 1716 (region="us-west-1") may comprise different values for one or more spans in a trace. Finally, tags 1706 (comprising error status code values), 1708 (root_cause_error flag), and 1704 (error span flag) are span-level tags that comprise heuristics to identify an error span and determine a span error frame for the associated error span (as discussed in connection with FIGS. 13A-13D).

Figure 18:
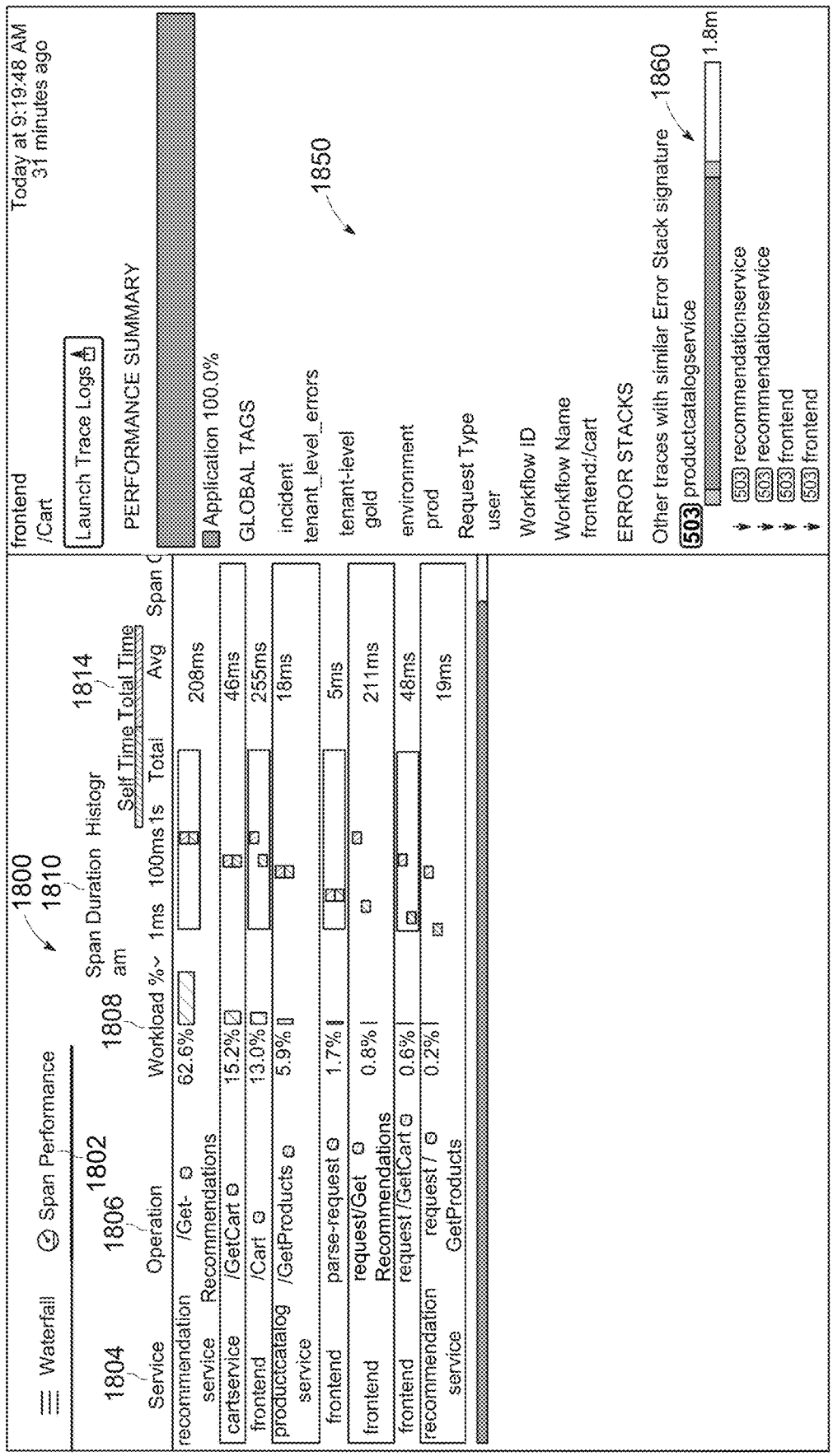
FIG. 18 illustrates an exemplary on-screen GUI showing an exemplary representation of a trace by span performance in accordance with embodiments of the present invention.

FIG. 18 illustrates an exemplary on-screen GUI showing an exemplary representation of a trace by span performance in accordance with embodiments of the present invention. In an embodiment, a client is able to view the trace 1800 by "span performance" 1802. Under the span performance view, for each span, the client is provided details regarding the name of the service 1804 that generated the span, the operation name 1806 within the service that was executed to create the span, the workload percentage 1808 undertaken by the span, the span duration 1810, and information regarding the span execution duration 1814. Similar to the waterfall view of FIG. 16, the exemplary GUI also provides information pertaining to the global tags 1850 associated with trace 1800, and error stacks 1860 associated with trace 1800.

Figure 19:
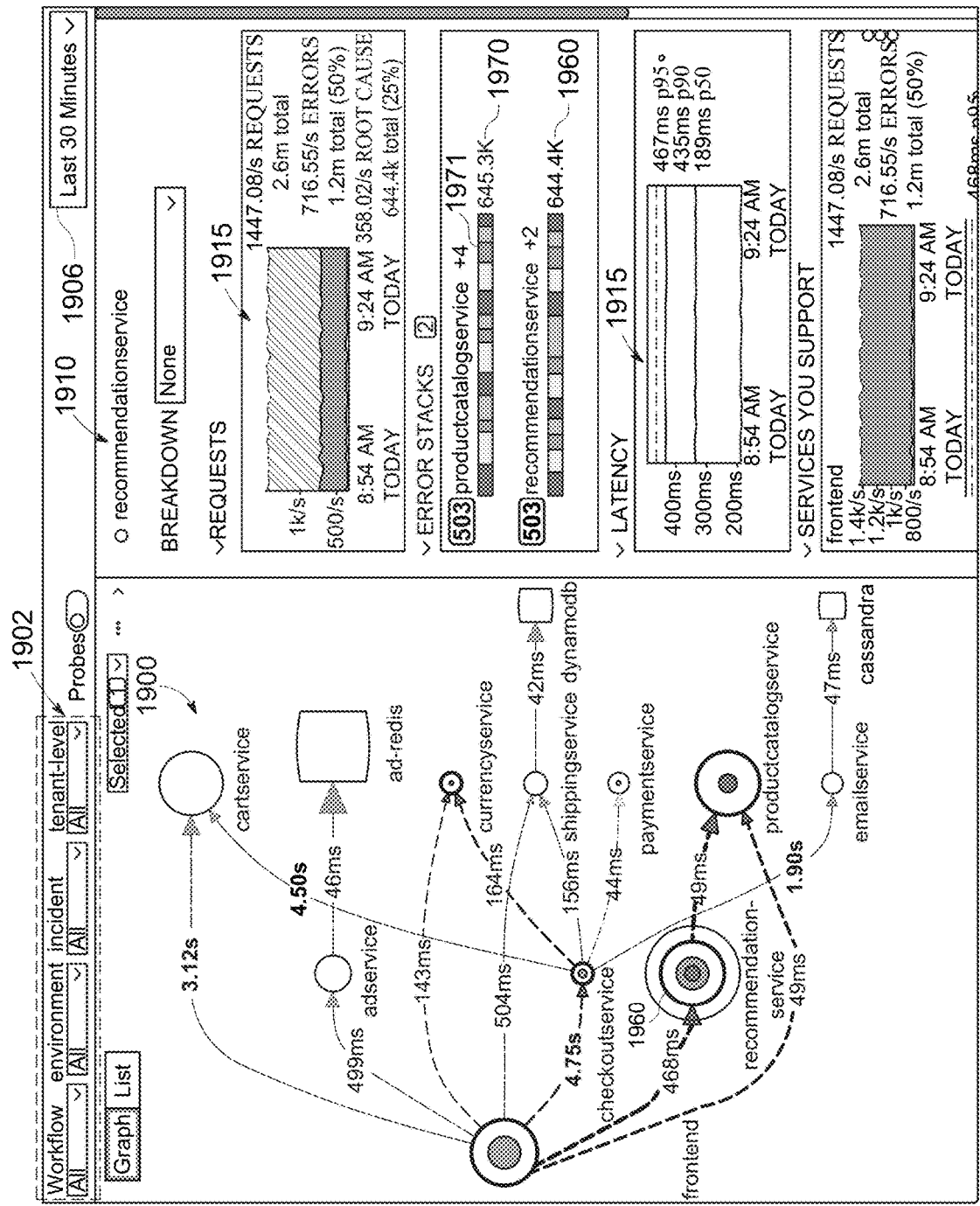
FIG. 19 illustrates an exemplary on-screen GUI showing the manner in which a service node in the application topology may be selected to provide error information specific to the selected node in accordance with embodiments of the present invention.

FIG. 19 illustrates an exemplary on-screen GUI showing the manner in which a service node in the application topology may be selected to provide error information specific to the selected node in accordance with embodiments of the present invention.

In an embodiment, selecting any one of the service nodes within the application topology provides error information in the side-bar 1910 associated with the selected node. For example, selecting recommendation service node 1960 will provide error information in the side-bar 1910 specific to recommendation service 1960 for a given duration (as selected using exemplary drop-down menu 1906). This information may comprise SLIs 1915 associated with recommendation service node 1960. The side-bar 1910 may also comprise distributed error stacks 1960 and 1970 for the selected service node, where the selected service may either be associated with the root cause error span (as is the case with stack 1960) or where the selected service may be associated with one of the frames in the error stack (as is the case with stack 1970). It should be noted that the heat-maps (e.g., heat-map 1971) for each error stack visually are dynamic and indicate the intensity of error activity for the selected time duration. For example, darker shades of color for portions of the heat-map indicate higher error activity than lighter shades. Alternatively, instead of shades of color, different patterns may be used for different levels of error activity.

Further, as previously discussed in connection with FIGS. 6 and 9, drop-down menus 1902 provide a range of different dimensions; the service graph 1900 and error stacks (e.g. 1960 and 1970) may be analyzed across one or more different combinations of these dimensions for a given duration of time (selected using exemplary drop-down menu 1906).

Figure 20:
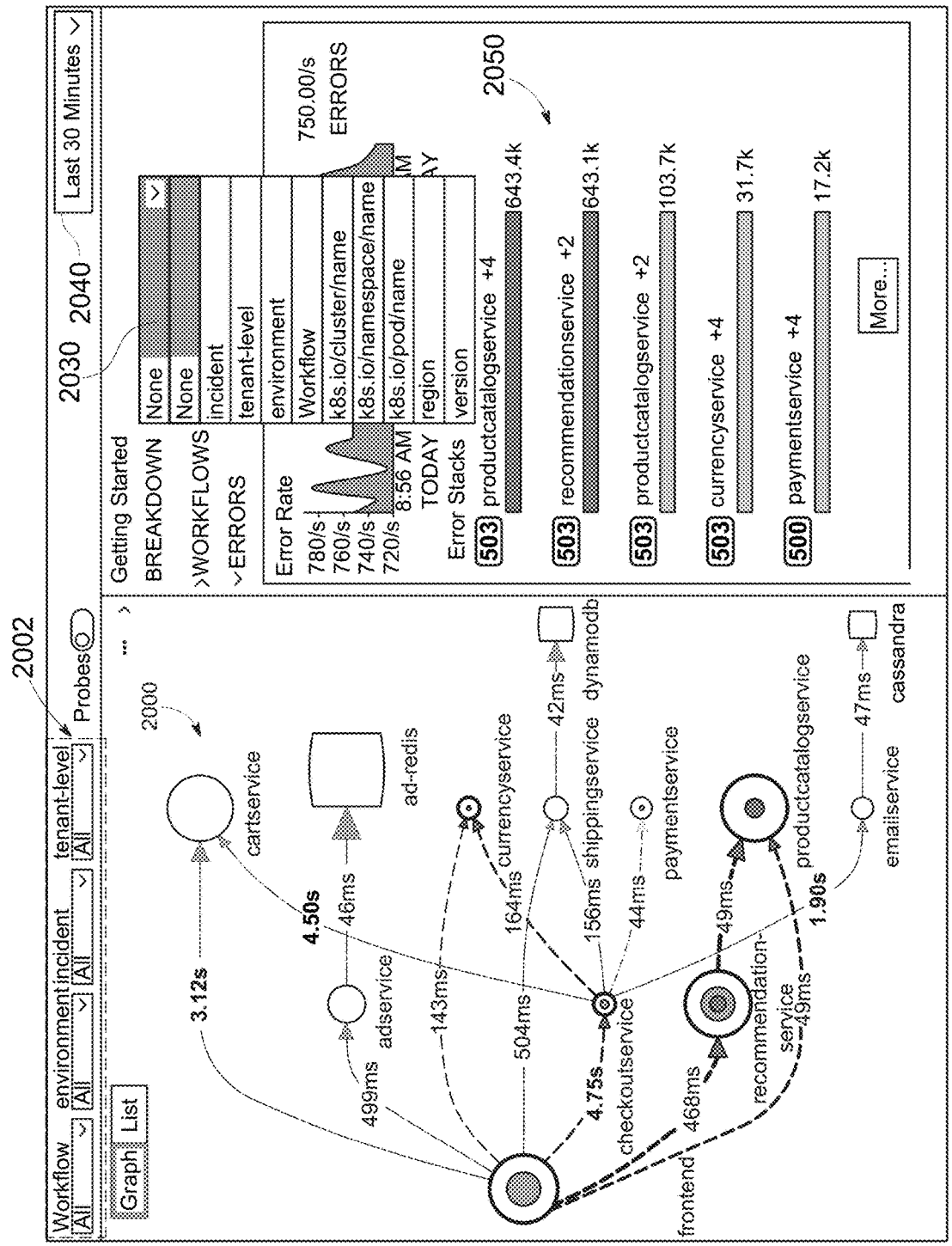
FIG. 20 illustrates an exemplary on-screen GUI showing the manner in which the distributed error stacks associated with an application topology may be broken down by various dimensions in accordance with embodiments of the present invention.

FIG. 20 illustrates an exemplary on-screen GUI showing the manner in which the distributed error stacks associated with an application topology may be broken down by various dimensions in accordance with embodiments of the present invention.

In an embodiment, the exemplary GUI of FIG. 20 illustrates an application topology graph 2000 and associated error stacks 2050, where the error stacks 2050 may be broken down and visualized by various dimensional criteria. While drop-down menus 2002 may be used to select a particular combination of dimensions, menu 2030 allows a client to break down (or fragmentize) the error stacks by a given category of dimensions. For example, a client may be able to visualize the error stacks broken down by "tenant-level," "incident," "environment," "workflow," etc. for a particular window of time (as selected by drop-down menu 2040). An exemplary break-down by workflow is illustrated in FIG. 21.

Figure 21:
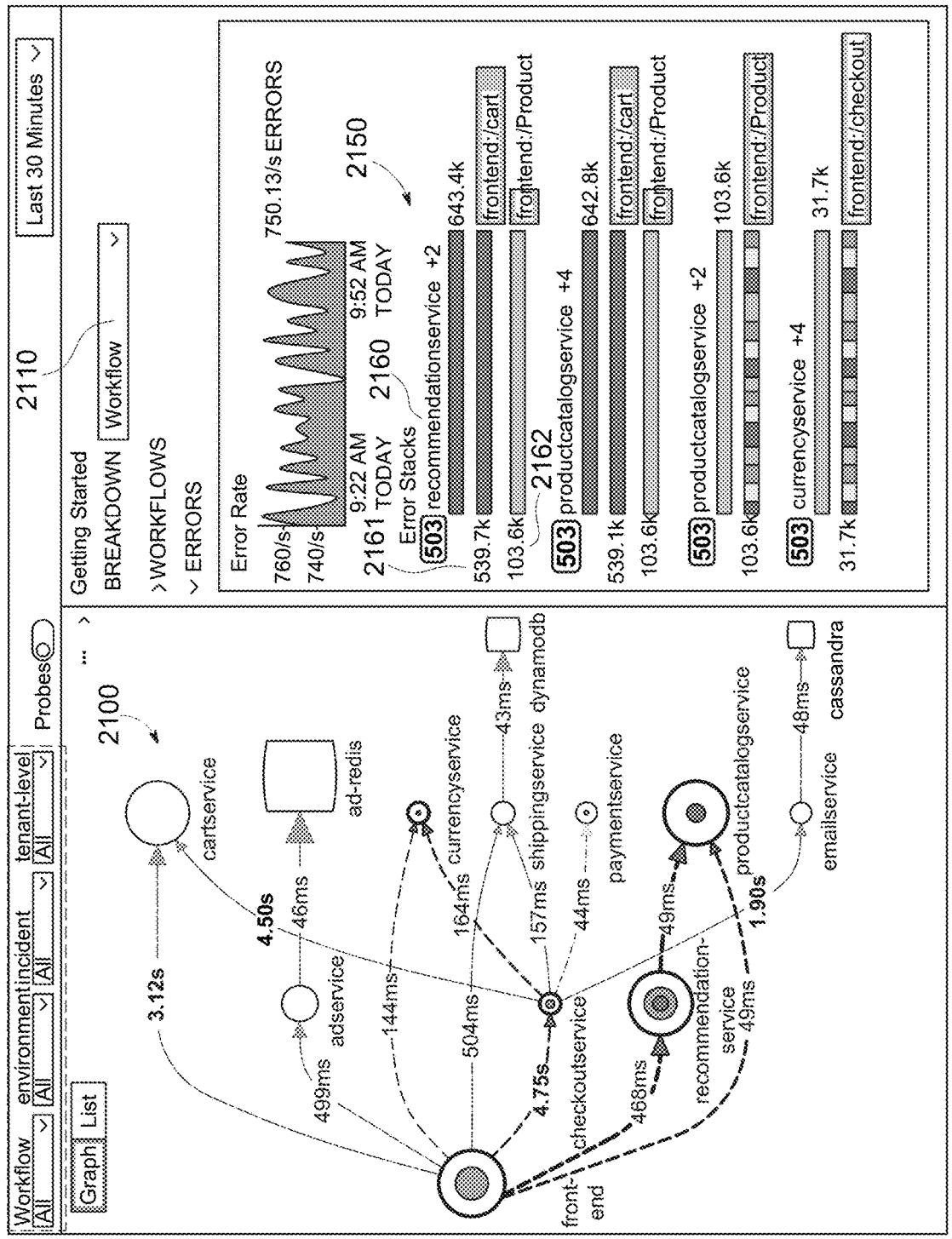
FIG. 21 illustrates an exemplary on-screen GUI showing the manner in which the distributed error stacks associated with an application topology may be broken down by the workflow category in accordance with embodiments of the present invention.

FIG. 21 illustrates an exemplary on-screen GUI showing the manner in which the distributed error stacks associated with an application topology may be broken down by the workflow category in accordance with embodiments of the present invention.

In an embodiment, when "workflow" is selected as the breakdown category using menu 2110, error stacks 2150 are broken down to show the workflows associated with each respective error stack. "Workflows," as mentioned previously, are a dimension or attribute of the user request. Breaking down errors by workflows, for example, allows a client to efficiently determine which of the workflows (in the user-request) resulted in the most errors. As seen in FIG. 21, of the 643.4 k error count associated error stack 2160, workflow 2161 resulted in 539.7 k errors while workflow 2162 resulted in only 103.6 k errors. Accordingly, the client can conclude that the "cart" operation associated with workflow 2161 is more problematic than the "product" operation.

4.4 Mapping Error Stacks Across Multiple Attributes

Figure 22:
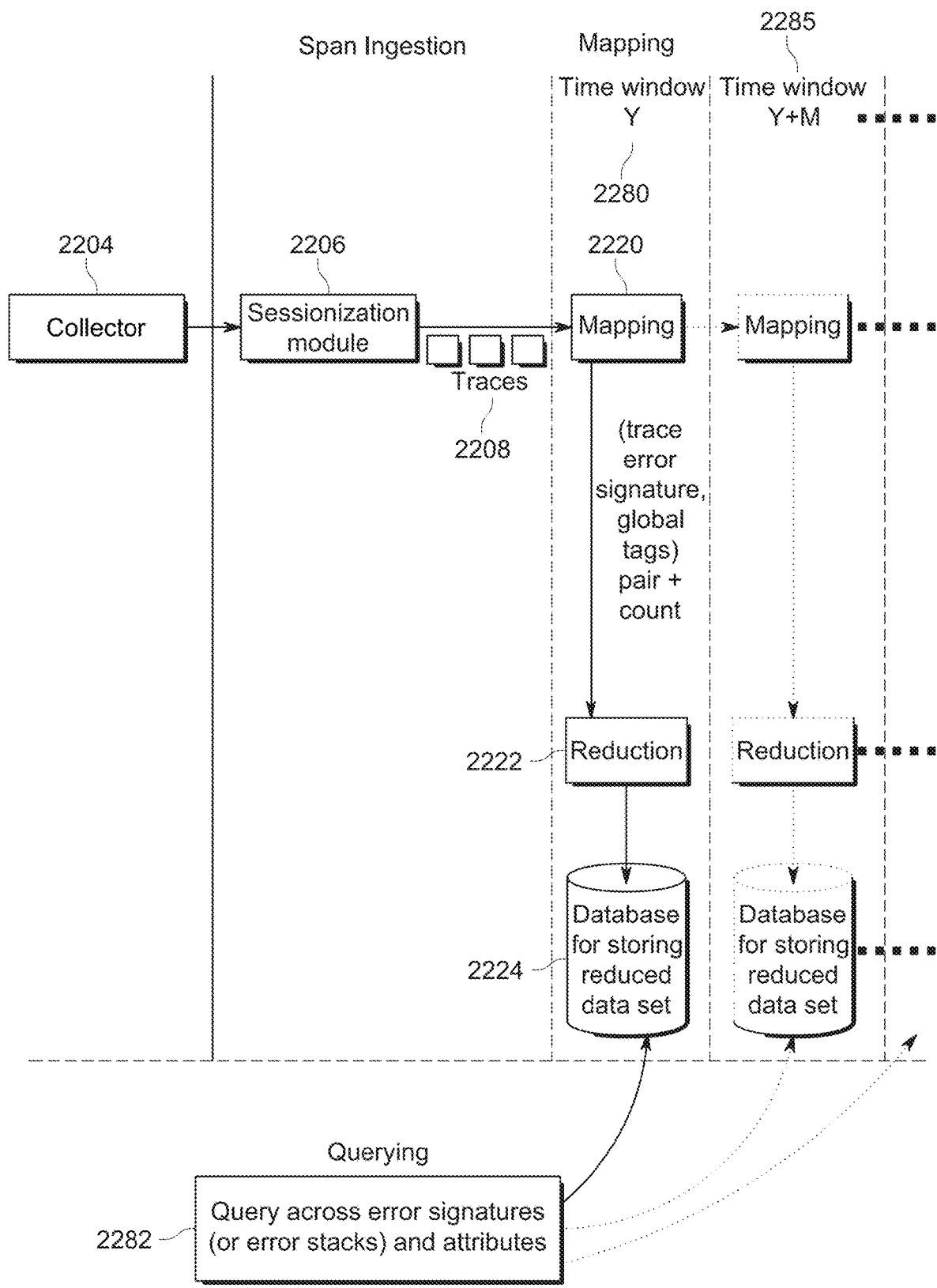
FIG. 22 is a flow diagram that illustrates an exemplary method for ingesting and aggregating trace information across various trace error signatures and dimensions in accordance with embodiments of the present invention.

FIG. 22 is a flow diagram that illustrates an exemplary method for ingesting and aggregating trace information across various trace error signatures and dimensions in accordance with embodiments of the present invention.

As mentioned in connection with FIG. 22, span information is received at a monitoring service from a collector 2204. The span information is then combined into traces in real-time in a process called sessionization. The sessionization module 2206 is responsible for stitching together or combining the traces 2208 using, among other things, the Trace IDs associated with each user-request. In addition to a Trace ID, each trace also comprises a time-stamp; using the time-stamps and the Trace IDs, the sessionization module 2206 creates traces from the incoming spans in real-time and sessionizes them into discrete time windows. For example, the sessionization process may consolidate traces (from spans) within a first 15-minute window (associated with time window Y 2280) before transmitting the traces to the mapping module 2220. Thereafter, the sessionizatoin process may consolidate traces within the subsequent 15 minutes (associated with time window "Y+M" 2285) before transmitting those traces to the mapping module 2220.

In some embodiments of the present invention, the sessionization module is able to ingest, process and store 100% of the spans received from the collector 2204 in real-time. By comparison, conventional monitoring systems do not accept 100% of the incoming spans or traces; instead, they sample incoming spans (or traces) to calculate SLIs at the root level of a trace before discarding the spans. Embodiments of the present invention, by comparison, comprise an ingestion streaming pipeline that is able to ingest and consolidate all the incoming spans into traces in real-time, and is further able to use advanced compression methods to store all the traces.

As noted above, the sessionization module 2206 collects all the traces within a first time window Y 2280 (e.g., a duration of M minutes) using the time-stamps for the traces and then emits them to a mapping module 2220. In one or more embodiments, the mapping module 2220 receives all the traces generated within a predetermined time window Y 2280 and maps each trace to one or more {trace error signature, global tags} pairs, where each trace can comprise multiple different trace error signatures. In other words, mapping module 2220 receives traces from the sessionization module 2206 for a given time duration and emits several {trace error signature, global tags} pairs associated with the received traces. Note that each pair comprises a single trace error signatures, but can comprise multiple global tags (or attributes).

In order to perform the mapping, the mapping module 2220 first computes one or more trace error signatures (or error stacks) associated with each trace and also determine the global-level attributes for each trace. Global tags, as noted previously, represent properties of a user-request (e.g. tenant name, tenant level, client location, environment type, etc.) and each trace is associated with its own respective unique set of global tags that comprise valuable information regarding the user-request (e.g., global tags 1650 as discussed in connection with FIG. 16).

In different embodiments, mapping module 2220 may also be able to map traces to other hierarchies of tags, e.g., service-level tags, team-level tags, span-level tags, etc.

Subsequently, mapping module 2220 also receives and maps traces generated within the next time window 2285 (e.g., Y+M mins or secs) to {trace error signature, global tags} pairs. Thereafter, the process is repeated for all subsequent time windows in increments of M mins or secs.

For each time window, each unique {trace error signature, global tags} pair emitted by mapping module 2220 is then reduced and associated with a count value using reduction module 2222. Mapping module 2220 and reduction module 2222 together are able to aggregate all the distributed error stacks by the associated global attributes. Because potentially millions of traces may be collected for any given time window, there may be several thousand {trace error signature, global tags} pairs generated for each time window. These duplicate pairs may be reduced using reduction module 2222 and an associated count may be maintained that keeps track of the number of times any particular pair occurs for a given time window.

The pairing created by mapping module 2220 allows error stacks to be associated with global tag (or attribute) values. Subsequently, the reduction process (using reduction module 222) allows a count value to be maintained for each unique {trace error signature, tags} pair. Aggregating trace error signatures by all the attributes allows users the ability to filter the error information accumulated by any dimension, e.g., a client may filter out errors stacks where "environment=prod" and "tenant=gold."

The pairing and reduction process enable embodiments of the present invention to support breaking down the distributed error stacks by different dimensions (e.g., global tags). For example, a user may be able to break down error stacks by tenant-level. Specifically, a client is able determine the number of times an error stack occurs per attribute value (e.g., tenant-level) over time. For example, a client may create queries through an exemplary user-interface 2282 that enables the client to query and filter all the error stacks across several dimensions.

A client may send in a request to retrieve error stacks that match a particular set of filters through query interface 2282. A request may ask to retrieve all error stacks that originate from or include a particular service and, further, include a set of tag filters as well. For example, the client query may request error stacks originating from a specified service (e.g., recommendation service) where "environment=prod" and "tenant=gold." The filter may be defined based on a) the services comprising the frames in the error stack, where each service may either be an "error originating" service or an "error propagating" service (a service through which the error passes); and b) a set of tag or dimensional filters. In response to the query, the monitoring platform may access databases 2224 to return a list of error stacks that match the filtering criteria, and the number of traces for each error stack over the queried time window.

In an embodiment, during the mapping and reduction process, summary metrics other than the count may also be maintained for each {trace error signature, global tags} pair. For example, a "sum of request duration" metric may be maintained, which allows clients to estimate duration percentiles for each error stack. There may also be other user-provided metrics that are extracted from the tags of the trace and can be maintained for each {trace error signature, global tags} pair.

In an embodiment, the monitoring platform maintains exemplar traces in storage for each {trace error signature, global tags} pair, which allows the user to load up exemplar traces (as was discussed in connection with FIGS. 16, 17 and 18).

The data associated with the {trace error signature, global tags} pairs and the associated count for each time window is then normalized and persisted in the back-end in storage module 2224. There may be several different ways the trace data is persisted in the back-end. For example, in an embodiment, the data may be stored in a non-normalized (or non-optimized) fashion where for each window of time, each unique {trace error signature, global tags} pair is stored individually.

In a different embodiment, however, the storage for the {error stack, tags} pairs may be optimized. One method of optimizing storage for the {error stack, tags} pairs is assigning each unique pair of {error stack, tags} to an ID. When a client sends in a request to retrieve error stacks that match a particular filter, a first request on the back-end is generated to collect the unique IDs of error stacks that match the filter for a particular range of time. The result of the first request is then used to generate a second request on the back-end that summarizes the number of traces (or other metrics) for each of the unique IDs. A list of error stacks and associated metrics is then returned to the client that matches the user's filter over a specified range of time. This process of normalizing the data allows the error-related data to be stored efficiently without unnecessary duplication.

FIG. 23 illustrates the manner in which spans generated by a microservices-based application may be filtered by their associated attributes through an exemplary GUI in accordance with embodiments of the present invention.

In an embodiment, a client may be able to enter dimensional criteria in an exemplary GUI 2300 to filter out spans with user-specified attributes. For example, in the exemplary GUI 2300 of FIG. 23, a user is searching for all spans where "environment" field 2320 equals "prod," "request type" field 2340 equals "user," and the duration of the span field 2360 is specified to vary from 200 ms to 400 ms. Further, the user can specify using drop-down menu 2380 that only spans that occurred within the last 30 minuets should be searched and displayed. It should be noted that the GUI 2300 allows a user to add other dimensions using an "Add Filter" option 2380. Responsive to the query, the client is provided all the spans 2350 matching the criteria specified.

Figure 24:
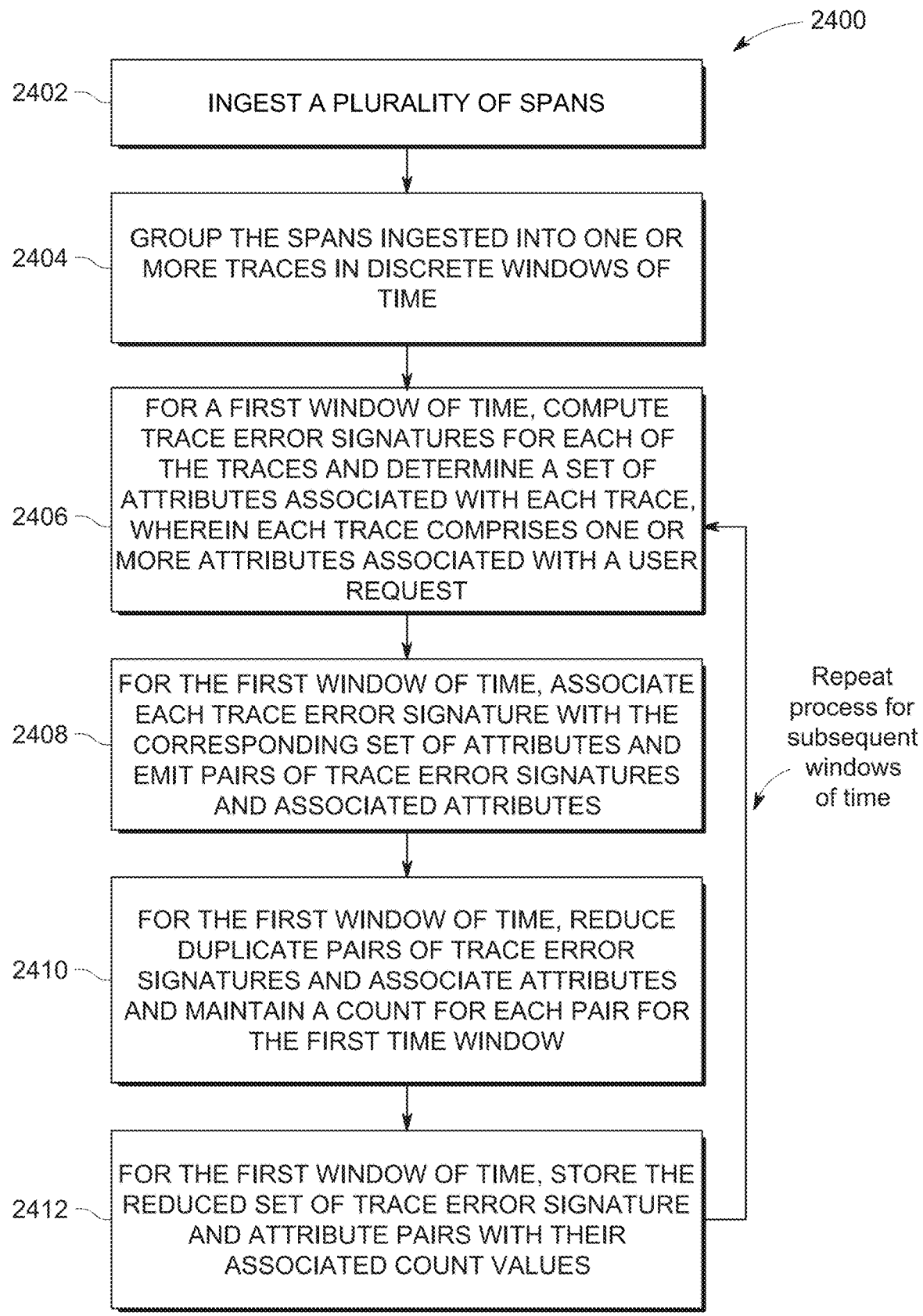
FIG. 24 presents a flowchart illustrating the manner in which trace information may be aggregated across trace error signatures and attributes in accordance with embodiments of the present invention.

FIG. 24 presents a flowchart illustrating the manner in which trace information may be aggregated across trace error signatures and attributes in accordance with embodiments of the present invention. Blocks 2402-2412 describe exemplary steps comprising the process 2400 depicted in FIG. 24 in accordance with the various embodiments herein described. In one embodiment, the process 2400 is implemented at least in part as computer-executable instructions stored in a computer-readable medium and executed in one or more processing devices.

At block 2402, a plurality of spans from a collector are ingested, where each span comprises at least a Trace ID associated with a user-request. In one embodiment, the spans are ingested in real-time.

At block 2404, the spans are grouped into one or more traces in discrete windows of time. A sessionization process is used whereby, using the time-stamps and the Trace IDs associated with each trace, traces are created from the incoming spans such that each session of the sessionization process creates traces associated with a corresponding window of time.

At block 2406, for a first window of time, trace error signatures for each trace in the first window are computed and the associated set of attributes for each trace are determined, wherein the attributes comprise information pertaining to a user-request associated with a corresponding trace.

At block 2408, for the first time window, each pair of computed trace error signature with its associated set of attributes is emitted using, for example, a mapping module 2220.

At block 2410, for the first time window, duplicate pairs of trace error signature and associated attributes are reduced and a count is maintained for the number of occurrences of each pair within the first time window.

At block 2412, the unique pairs of trace error signature and associated attribute values are stored along with their respective counts. Thereafter, the process is repeated for subsequent windows of time.

5.0 Probe Exclusion

Trace data received a monitoring service (e.g., monitoring service 306) typically includes requests made to a microservices-based system by a user, but it may also include requests from other originators of data such as requests made by a system or a third-party service. Probes are "bots" (software applications that run automated tasks or scripts) that generate automated requests (and associated traces) as opposed to requests (and associated traces) that originate from actual user actions. There are many examples of probes including: health checks (e.g. Kubernetes checking the health of a microservice), monitoring (e.g. Prometheus scraping metrics), and others (e.g. getting credentials).

Often clients are more interested in analyzing or viewing metrics related to user flows or user requests without the results being polluted by probe requests. Further, some type of probe requests (e.g., runscope) may be problematic because they can often trigger expected failures, which, when aggregated by a conventional monitoring platform, may appear to a client as though problematic incidents are occurring in the environment if the monitoring platform is unable to distinguish between expected failures and unexpected failures. In other instances, the probes may only be providing metrics related to, for example, the health of a service and may not be as interesting to an application owner that is focused on troubleshooting availability and performance related issues.

In order to address this shortcoming of conventional monitoring platforms, embodiments of the present invention provide clients the ability to exclude probe requests from the displayed aggregated results. The probe exclusion feature is intended to help the application owners and developers distinguish between traces generated from probes and traces generated from actual user requests to an application and its comprising services. Further, it prevents SLIs computed for any given service in a microservice architecture from being polluted by probe information. Embodiments of the present invention can automatically exclude probe related requests from the default SLI computation so that clients can get a view of the "real" traffic, while allowing the "true" full-fidelity view if desired (which includes probes).

Embodiments of the present invention may provide a toggle radio button 680 (shown in FIG. 6) that is a GUI elements and allows a client to toggle between displaying and hiding probe related information on service graph 600. It should be noted that embodiments of the present invention may also provide the ability to toggle between displaying and hiding probe related information with several different types of GUI elements, e.g., GUIs related to displaying Service Level Indicator (SLI) and service health related information.

In one or more embodiments of the present invention, monitoring service 306 may also configure a component running within a collector (e.g., collector 304) that will gather metrics for each type of request (e.g., user, probe, etc.) even if the actual traces are not all sampled. This would enable full-fidelity aggregate calculations on request types along with exemplars even if all the traces cannot be transmitted from the collector to the monitoring service 306. In some embodiments, filtering of traces for all (or some) classes of bot-initiated requests can be enabled at the collector to preserve bandwidth and storage costs.

Figure 25:
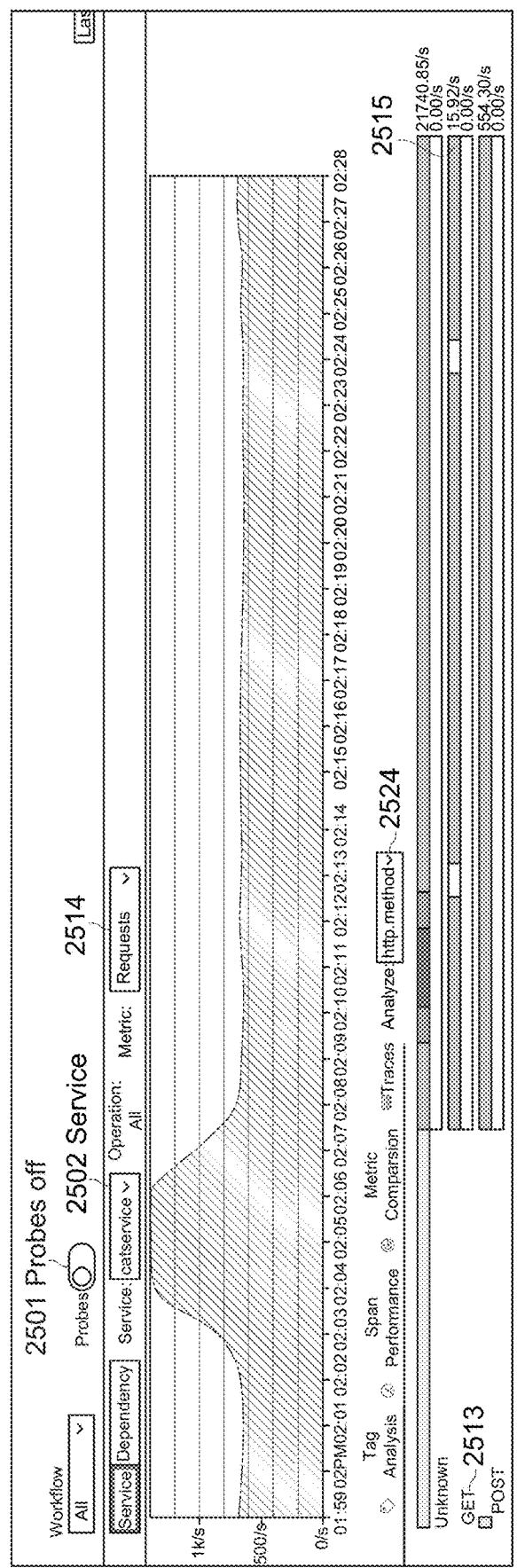
FIG. 25 is an exemplary on-screen GUI showing requests associated with a particular service with the probe option turned off in accordance with embodiments of the present invention.

FIG. 25 is an exemplary on-screen GUI showing requests associated with a particular service with the probe option turned off in accordance with embodiments of the present invention. FIG. 25 illustrates service health related information associated with a "cartservice" service 2502. The GUI comprises a drop-down menu 2514 to select the type of metric (in this case, "Requests") and a separate drop-down menu 2524 to select the type of request (in this case, "http.method") to be monitored. The probe toggle button 2501 is turned off in this GUI, which means that probes are excluded. For example, for the GUI illustrated in FIG. 25, the "GET" trace is excluded and, accordingly, the number of GET requests 2515 identified in the GUI is miniscule (e.g., 15.92 GETs/sec).

Probe exclusion is typically based upon out-of-the box standardized rules that can be further customized based on specific environment properties. In one embodiment of the present invention, the monitoring service 306, for example, pre-populates definitions for the traces that need to be excluded as probe-related traces at the back-end of the platform (e.g., using a regex based rule system or a JSON query language). A probe may, for example, be defined based on any attribute or tag of any span within a trace. If any span within a trace for example, meets the definitional criteria, the entire trace associated with that span would be considered a probe trace.

In a different embodiment, an application owner using the monitoring platform may be able to define the traces to be filtered out as probe traces through a GUI dialog box. Again, a probe may be defined by the client based on any attribute or tag of any span within a trace.

Figure 26:
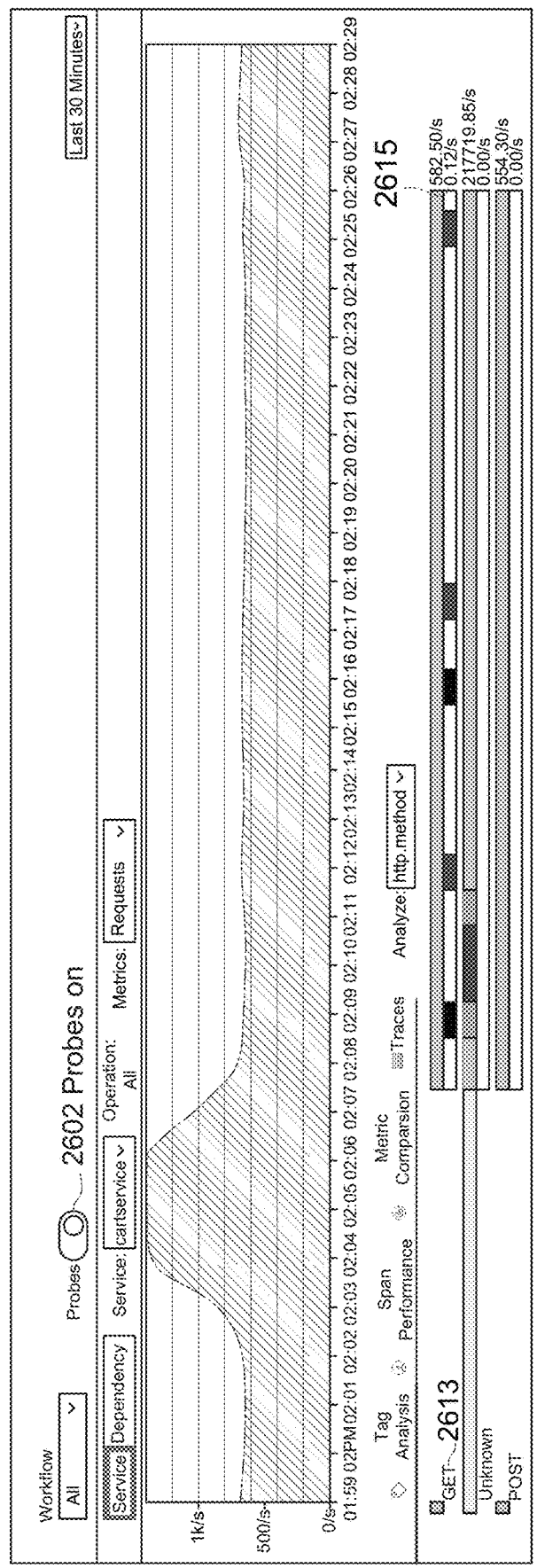
FIG. 26 is an exemplary on-screen GUI showing requests associated with a particular service with the probe option turned on in accordance with embodiments of the present invention.

FIG. 26 is an exemplary on-screen GUI showing requests associated with a particular service with the probe option turned on in accordance with embodiments of the present invention. As seen in FIG. 26, the probe toggle switch 2602 is turned on. With probe exclusion inactivated, the number of requests 2615 associated with the "GET" trace 2613 increases significantly to 582/sec.

Figure 27:
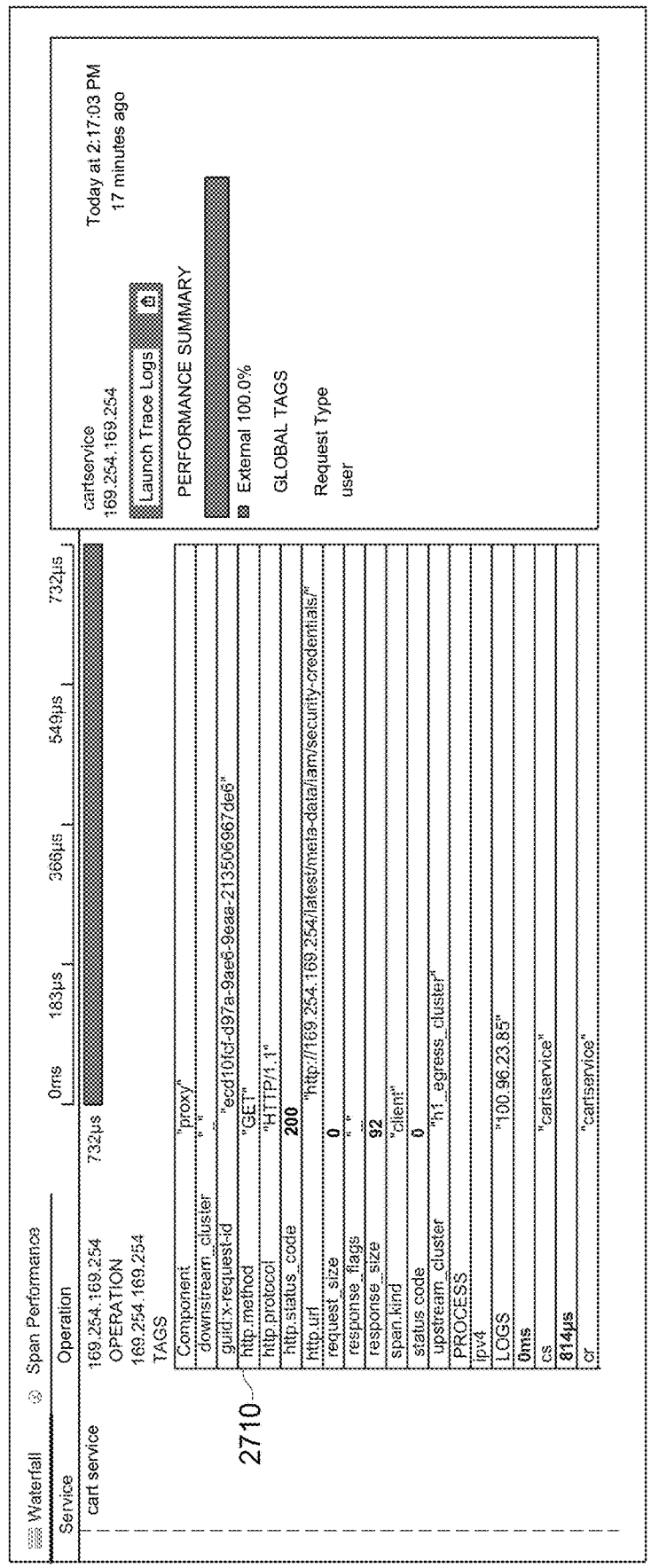
FIG. 27 is an exemplary on-screen GUI showing a probe related span in accordance with embodiments of the present invention.

FIG. 27 is an exemplary on-screen GUI showing a probe related span in accordance with embodiments of the present invention. As shown in FIG. 23, the "cartservice" span comprises an http.method tag 2710 with a value of "GET."

As noted above, a monitoring platform may need to pre-define traces related to the "cartservice" service comprising an http.method tag with a value of "GET" as a probe trace. This definition may be created using either a GUI, a query language such as JSON or a regex based rule system. Once the probe has been defined, a JSON payload may, for example, be sent to the back-end of the platform to configure the probe. Subsequently, when the spans are ingested by the monitoring service 306, any spans where the http.method tag has a value of "GET" would be identified and the trace associated with that span would be flagged as a probe trace. These probe traces may then be excluded by a client using the probe toggle switch 2602. It should be noted that there is no limit to the number of probes that may be pre-defined and enabled in the monitoring platform. Also, as noted above, a probe may be defined based on any tag or attribute of any span within a trace.

Figure 28:
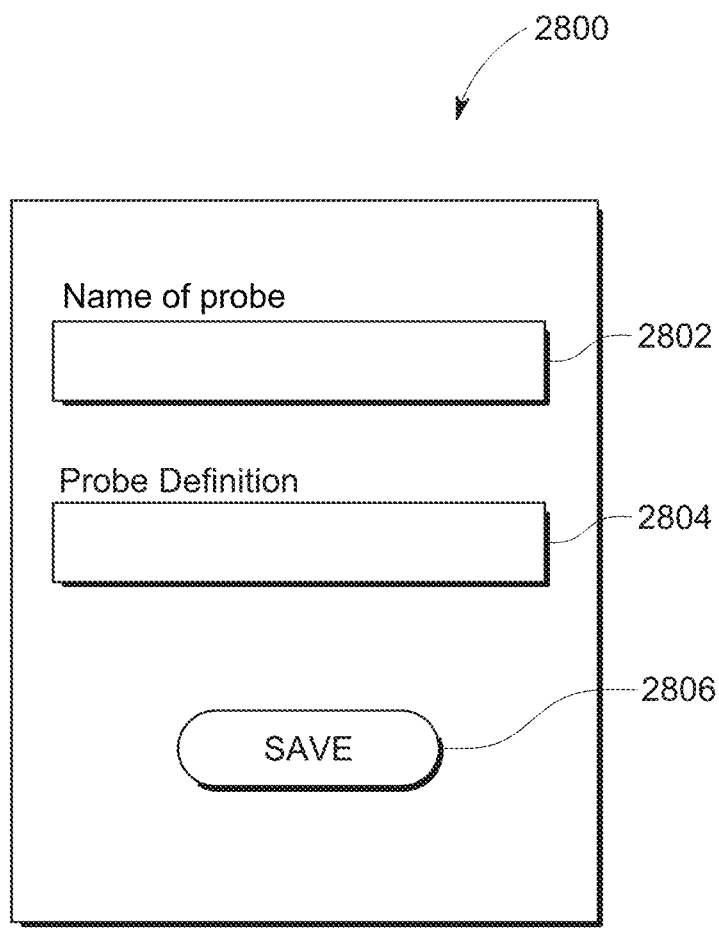
FIG. 28 is an exemplary on-screen GUI illustrating a pop-up dialog box that allows a client to define its own probe in accordance with embodiments of the present invention.

FIG. 28 is an exemplary on-screen GUI illustrating a pop-up dialog box that allows a client to define its own probe in accordance with embodiments of the present invention. As noted above, in one embodiment, instead of manually configuring the probes, an application owner using the monitoring platform may be able to define the traces to be filtered out as probe traces through a GUI pop-up dialog box, e.g., dialog box 2800. The client may be first directed to a GUI that provides an interface to add/remove a probe. If the client elects to add a probe, a dialog box 2800 may pop open where the criteria for the probe can be defined. Further, the client may be prompted to enter values for the following fields: "Name of probe" 2802 and "Probe Definition" 2804. For example, for field 2804, a value of "http.method==GET" may be entered. The monitoring platform may then identify any spans that meet the defined criteria (e.g. "http.method==GET") and flag traces associated with those spans as probe traces. Finally, a Save button 2806 allows the probe definition to be saved and added to the set of other previously defined probes.

Alternatively, if the client elects to delete a probe, the GUI may provide an interface that allows a selected probe to be deleted.

6.0 Logs, Traces, and Metrics

As mentioned above, the shift from monolithic applications to microservices-based architectures has increased the usefulness of analyzing traces in a distributed system. In other implementations, the tracing data analyzed herein may be coupled with log data and/or metrics data, in order to provide users with a more complete picture of the system. For example, the trace data may be coupled with log or other data from a data intake and query system. One example of a data intake and query system is the event-based data intake and query SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. One example of the SPLUNK® ENTERPRISE system is described in more detail in U.S. patent application Ser. No. 15/011,651, entitled "TOKENIZED HTTP EVENT COLLECTOR, filed on 31 Jan. 2016, and U.S. patent application Ser. No. 14/503,335, entitled "GENERATING REPORTS FROM UNSTRUCTURED DATA", filed on 30 Sep. 2014, each of which is hereby incorporated by reference in their entirety. In another example, the data intake and query system may be based on a distributed or cloud-based service, for example, as described in U.S. patent application Ser. No. 15/665,148, entitled QUERY PROCESSING USING QUERY-RESOURCE USAGE AND NODE UTILIZATION DATA, filed on 31 Jul. 2017.

In one embodiment, the trace data may be ingested into the data intake and query system, or may be coupled with outputs from the data intake and query system, e.g., from searches that may be based on trace data and run on the data intake and query system. In some embodiments, the data intake and query system described above may be integrated with or into the monitoring platform that analyzes trace data, e.g., monitoring service 306. Monitoring service 306 may, accordingly, comprise a fill suite of services including, for example, analyzing trace data, ingesting and analyzing log data, ingesting metrics data and providing insights generated from the metrics data, including aggregating and/or correlating trace data, log data, and metrics data, in order to gain insights into a computing platform.

As described above, the trace data may be sent to systems configured to ingest and search data, such as the data intake and query systems described above. Additionally, other implementations may use a stream processor that can perform transformations and other operations on incoming data prior to, or as an alternative to, ingestion of the data. In some implementations, the system may also be configured to ingest metrics data and may be optimized to ingest, query, and generate insights from metrics data, as described in U.S. patent application Ser. No. 15/339,863, titled STORING AND QUERYING METRICS DATA, and published as U.S. Patent Application Publication No. 2018/0089286.

In other implementations, metrics may be generated by instrumentation and sent to a SaaS-based processing system. For example, software may be instrumented to send metrics to a gateway or to another source, where metrics may be aggregated, queried, and alerted. Some examples of these systems are described in U.S. Pat. No. 9,846,632, titled, REAL-TIME REPORTING BASED ON INSTRUMENTATION OF SOFTWARE, the entirety of which is herein incorporated by reference. As above, the trace data may be paired with data from the data intake and query system, metrics generated by instrumentation, and other data sources, and correlated in various ways to provide insights. For example, as a broad-based correlation example, the metrics data may be used in a thresholding comparison to determine that there is an issue that needs attention, the trace data may be used to determine which component or microservice requires attention, and log data from the data intake and query system may be used to determine exactly why the component or microservice needs attention. Other correlations and uses for the combination of metrics data, log data, and event data are also contemplated herein. As noted above, all the various features and services may be provided within an integrated monitoring platform, e.g., monitoring service 306.

While the principles of the invention have been described above in connection with specific apparatus, it is to be clearly understood that this description is made only by way of example and not as a limitation on the scope of the invention. Further, the foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of tracking errors in a system comprising microservices, the method comprising:
    ingesting a plurality of spans generated by the microservices during a first duration of time;
    consolidating the plurality of spans associated with the first duration of time into a plurality of traces, wherein each trace comprises a subset of the plurality of spans that comprise a common trace identifier;
    for each trace of the plurality of traces:
        mapping a respective trace to one or more error stacks computed for the respective trace and to one or more attributes determined for the respective trace; and
        emitting each error stack computed from the respective trace with an associated pair of attributes; and
    reducing duplicate pairs of error stack and associated attributes and maintaining a count value for each pair of error stack and associated attributes.

2. The method of claim 1, further comprising:
    storing each pair of error stack and associated attributes with the count value in a database, wherein the count value is associated with a number of times each pair occurred during the first duration of time; and
    storing each pair of error stack and associated attributes with a summary metric in the database, and wherein the database is operable to be queried by a client.

3. The method of claim 1, further comprising:
    repeating the ingesting, the consolidating, the mapping, the emitting and the reducing for each subsequent duration of time.

4. The method of claim 1, wherein the ingesting is performed in real-time.

5. The method of claim 1, wherein the ingesting comprises ingesting all of the spans generated by the microservices during the first duration of time.

6. The method of claim 1, further comprising:
    prior to the ingesting, excluding spans that are associated with probe data from the plurality of spans.

7. The method of claim 1, wherein the one or more attributes determined for the respective trace pertain to a user request.

8. The method of claim 1, wherein the one or more error stacks computed for the respective trace comprises an ordered list of span error frames, wherein the top-most frame in the ordered list is associated with a root cause error span, wherein each subsequent span error frame is associated with a parent span of a prior span in the ordered list, wherein a root cause error span comprises an error span associated with a microservice that originated an error, and wherein each span error frame in the ordered list comprises summary information associated with a respective span.

9. The method of claim 1, further comprising:
    storing each pair of error stack and associated attributes with the count value in a database, wherein the count value is associated with a number of times each pair occurred during the first duration of time; and
    providing a user a graphical user interface (GUI) to query the database.

10. The method of claim 1, further comprising:
    storing each pair of error stack and associated attributes with the count value in a database, wherein the count value is associated with a number of times each pair occurred during the first duration of time; and
    providing a user a graphical user interface (GUI) to query the database, wherein the GUI provides a user options to filter error information for each stored error stack across the associated attributes.

11. The method of claim 1, further comprising:
    prior to the ingesting, flagging spans, from the plurality of spans, that are associated with probe data;
    storing each pair of error stack and associated attributes with the count value in a database, wherein the count value is associated with a number of times each pair occurred during the first duration of time;
    rendering a user a graphical user interface (GUI) operable to submit a query to the database; and
    responsive to a user selection of an exclude option in the GUI, excluding the probe data from a result set displayed in response to the query.

12. The method of claim 1, further comprising:
    prior to the ingesting, excluding spans from the plurality of spans that are associated with probe data, wherein the probe data is defined based on user-specified criteria.

13. The method of claim 1, further comprising:
    prior to the ingesting, excluding spans from the plurality of spans that are associated with probe data, wherein the probe data is defined based on user-specified criteria entered using a GUI.

14. A non-transitory computer-readable medium having computer-readable program code embodied therein for causing a computer system to perform a method for tracking errors in a system comprising microservices, the method comprising:
    ingesting a plurality of spans generated by the microservices during a first duration of time;
    consolidating the plurality of spans associated with the first duration of time into a plurality of traces, wherein each trace comprises a subset of the plurality of spans that comprise a common trace identifier;
    for each trace of the plurality of traces:
        mapping a respective trace to one or more error stacks computed for the respective trace and to one or more attributes determined for the respective trace; and emitting each error stack computed from the respective trace with an associated pair of attributes; and reducing duplicate pairs of error stack and associated attributes and maintaining a count value for each pair of error stack and associated attributes.

15. The non-transitory computer-readable medium of claim 14, wherein the method further comprises:

storing each pair of error stack and associated attributes with the count value in a database, wherein the count value is associated with a number of times each pair occurred during the first duration of time, and wherein the database is operable to be queried by a client.

16. The non-transitory computer-readable medium of claim 14, wherein the method further comprises:

repeating the ingesting, the consolidating, the mapping, the emitting and the reducing for each subsequent duration of time.

17. The non-transitory computer-readable medium of claim 14, wherein the ingesting is performed in real-time.

18. The non-transitory computer-readable medium of claim 14, wherein the ingesting comprises ingesting all of the spans generated by the microservices during the first duration of time.

19. The non-transitory computer-readable medium of claim 14, wherein the method further comprises:

prior to the ingesting, excluding spans that are associated with probe data from the plurality of spans.

20. The non-transitory computer-readable medium of claim 14, wherein the one or more attributes determined for the respective trace pertain to a user request.

21. The non-transitory computer-readable medium of claim 14, wherein the one or more error stacks computed for the respective trace comprises an ordered list of span error frames, wherein the top-most frame in the ordered list is associated with a root cause error span, wherein each subsequent span error frame is associated with a parent span of a prior span in the ordered list, wherein a root cause error span comprises an error span associated with a microservice that originated an error, and wherein each span error frame in the ordered list comprises summary information associated with a respective span.

22. The non-transitory computer-readable medium of claim 14, wherein the method further comprises:

storing each pair of error stack and associated attributes with the count value in a database, wherein the count value is associated with a number of times each pair occurred during the first duration of time; and providing a user a graphical user interface (GUI) to query the database.

23. The non-transitory computer-readable medium of claim 14, wherein the method further comprises:

storing each pair of error stack and associated attributes with the count value in a database, wherein the count value is associated with a number of times each pair occurred during the first duration of time;

providing a user a graphical user interface (GUI) to query the database, wherein the GUI provides a user options to filter error information for each stored error stack across the associated attributes.

24. The non-transitory computer-readable medium of claim 14, wherein the method further comprises:

prior to the ingesting, flagging spans, from the plurality of spans, that are associated with probe data;

storing each pair of error stack and associated attributes with the count value in a database, wherein the count value is associated with a number of times each pair occurred during the first duration of time;

rendering a user a graphical user interface (GUI) operable to submit a query to the database; and responsive to a user selection of an exclude option in the GUI, excluding the probe data from a result set displayed in response to the query.

25. The non-transitory computer-readable medium of claim 14, wherein the method further comprises:

prior to the ingesting, excluding spans from the plurality of spans that are associated with probe data, wherein the probe data is defined based on user-specified criteria.

26. The non-transitory computer-readable medium of claim 14, wherein the method further comprises:

prior to the ingesting, excluding spans from the plurality of spans that are associated with probe data, wherein the probe data is defined based on user-specified criteria entered using a GUI.

27. A system for tracking errors in a network comprising microservices, the system comprising:

a processing device communicatively coupled with a memory and configured to:

ingest a plurality of spans generated by the microservices during a first duration of time;

consolidate the plurality of spans associated with the first duration of time into a plurality of traces, wherein each trace comprises a subset of the plurality of spans that comprise a common trace identifier;

for each trace of the plurality of traces:

map a respective trace to one or more error stacks computed for the respective trace and to one or more attributes determined for the respective trace; and emit each error stack computed from the respective trace with an associated pair of attributes; and reduce duplicate pairs of error stack and associated attributes and maintaining a count value for each pair of error stack and associated attributes.

28. The system of claim 23, wherein the processor is further configured to:

store each pair of error stack and associated attributes with the count value in a database, wherein the count value is associated with a number of times each pair occurred during the first duration of time, and wherein the database is operable to be queried by a client.

29. The system of claim 23, wherein the processor is further configured to:

repeat the ingesting, the consolidating, the mapping, the emitting and the reducing for each subsequent duration of time.

30. The system of claim 23, wherein the processor is further configured to ingest the plurality of spans in real-time.

* * * * *